(12) United States Patent
Greatwood

(10) Patent No.: US 11,775,662 B2
(45) Date of Patent: Oct. 3, 2023

(54) SEARCHING USING ENCRYPTED CLIENT AND SERVER MAINTAINED INDICES

(71) Applicant: Duncan MacDougall Greatwood, Palo Alto, CA (US)

(72) Inventor: Duncan MacDougall Greatwood, Palo Alto, CA (US)

(*) Notice: Subject to any disclaimer, the term of this patent is extended or adjusted under 35 U.S.C. 154(b) by 116 days.

(21) Appl. No.: 17/117,078

(22) Filed: Dec. 9, 2020

(65) Prior Publication Data

US 2021/0256146 A1 Aug. 19, 2021

Related U.S. Application Data

(62) Division of application No. 15/811,643, filed on Nov. 13, 2017, now Pat. No. 10,885,215.

(Continued)

(51) Int. Cl.
*G06F 21/62* (2013.01)
*H04L 9/08* (2006.01)
*H04L 9/40* (2022.01)
*G06F 16/248* (2019.01)
*G06F 16/2455* (2019.01)

(Continued)

(52) U.S. Cl.
CPC ........ *G06F 21/6209* (2013.01); *G06F 16/248* (2019.01); *G06F 16/2455* (2019.01); *G06F 16/27* (2019.01); *G06F 21/602* (2013.01); *G06F 21/6218* (2013.01); *G06F 21/6227* (2013.01); *G06F 21/6263* (2013.01); *H04L 9/0643* (2013.01); *H04L 9/0822* (2013.01); *H04L 9/0861* (2013.01); *H04L 9/0894* (2013.01); *H04L 63/0428* (2013.01);

(Continued)

(58) Field of Classification Search
CPC ............. G06F 21/6209; G06F 16/2455; G06F 16/248; G06F 16/27; G06F 21/602; G06F 21/6218; G06F 21/6227; G06F 21/6263; G06F 16/245; H04L 9/0643; H04L 9/0822; H04L 9/0861; H04L 9/0894; H04L 63/0428; H04L 63/083; H04L 63/123; H04L 2209/08
See application file for complete search history.

(56) References Cited

U.S. PATENT DOCUMENTS

2002/0038296 A1* 3/2002 Margolus .............. G06F 21/645
2007/0255698 A1 11/2007 Kaminaga
(Continued)

*Primary Examiner* — Mohammad W Reza
(74) *Attorney, Agent, or Firm* — Womble Bond Dickinson (US) LLP

(57) ABSTRACT

A method and apparatus of a device searches encrypted objects stored in a secure virtual storage space is described. In an exemplary embodiment, the device receives a search query that includes a set of tokens and encrypts the set of tokens. The device further creates a hashed set of encrypted tokens using a second hash function. In addition, the device sends the hashed set of encrypted tokens to a first search server as a query. Furthermore, the device receives, from the first search server, a first set of encrypted object names as a search result. The device additionally determines a set of client-side indexes to search by hashing at least some of the first set of encrypted object names using a first hash function. The device further decrypts the set of encrypted object names. The additionally searches the set of client-side indexes using the set of decrypted object names.

20 Claims, 17 Drawing Sheets

Related U.S. Application Data

(60) Provisional application No. 62/424,357, filed on Nov. 18, 2016.

(51) Int. Cl.
| | | |
|---|---|---|
| *G06F 21/60* | (2013.01) | |
| *G06F 16/27* | (2019.01) | |
| *H04L 9/06* | (2006.01) | |

(52) U.S. Cl.
CPC .......... *H04L 63/083* (2013.01); *H04L 63/123* (2013.01); *H04L 2209/08* (2013.01)

(56) References Cited

U.S. PATENT DOCUMENTS

| | | | |
|---|---|---|---|
| 2009/0006869 A1* | 1/2009 | Satya Sudhakar | .... G06F 16/137 |
| | | | 713/193 |
| 2012/0008769 A1* | 1/2012 | Collins | ................... G06F 21/34 |
| | | | 726/6 |
| 2015/0089368 A1 | 3/2015 | Lester | |
| 2015/0143112 A1 | 5/2015 | Yavuz | |
| 2015/0281184 A1 | 10/2015 | Cooley | |
| 2017/0085377 A1* | 3/2017 | Pogmore | ............... H04L 9/0869 |

\* cited by examiner

SEARCHING USING ENCRYPTED CLIENT AND SERVER MAINTAINED INDICES

RELATED APPLICATIONS

This Application is a divisional of U.S. patent application Ser. No. 15/811,643, entitled "SEARCHING USING ENCRYPTED CLIENT AND SERVER MAINTAINED INDICES filed Nov. 13, 2017; which claims the benefit of priority provisional application Ser. No. 62/424,357, filed Nov. 18, 2016, entitled "SEARCHING USING ENCRYPTED CLIENT AND SERVER MAINTAINED INDICES" the entirety of which is incorporated by reference.

FIELD OF INVENTION

This invention relates generally to data storage technology and more particularly to providing security for stored data by using data scattering.

BACKGROUND OF THE INVENTION

The growth of "public cloud" (e.g., Amazon AWS, Microsoft Azure, Google Cloud etc.) has made it simple and cost-effective to gain access to data center storage capacity. At the same time, there are concerns over who might have access to data stored in a shared or public data centers. Even where the data is stored in an encrypted form, concerns remain about where and how keys are stored and managed, how keys or communications might be compromised, etc.

SUMMARY OF THE DESCRIPTION

A method and apparatus of a device that stores an object on a plurality of storage servers is described. In an exemplary embodiment, the device receives an object to be stored and encrypts the object with a first key. The device further creates a plurality of bit vectors from the encrypted object. In addition, the device randomizes the plurality of bit vectors to generate a plurality of randomized bit vectors. Furthermore, the device sends the plurality of randomized bit vectors and the plurality of second keys to the plurality of storage servers, wherein each of the plurality of storage servers stores at least one each of the plurality of randomized bit vectors and the plurality of second keys.

In another embodiment, a device that reads an object stored on a plurality of storage servers is described. In this embodiment, the device receives an object identifier. The device further retrieves a client full key and a plurality of client half-keys. In addition, the device retrieves a plurality of encrypted randomized bit vectors and a plurality of server half-keys from the plurality of storage servers. The client additionally creates a plurality of bit vector keys from the plurality of server half-keys and the plurality of client half-keys. Furthermore, the client decrypts the plurality of encrypted randomized bit vectors using the plurality of bit vector keys. The device additionally assembles an encrypted object from the plurality of bit vectors and decrypts this encrypted object using the client full key. The device returns the object.

In a further embodiment, the device shares an object between a first user and a second user stored in a secure virtual storage space. In this embodiment, the device storing an object in a secure virtual storage space, where the object is encrypted using an object key and is stored as a first plurality of different randomized bit vectors stored in a first plurality of storage servers in the secure virtual storage space. In addition, the device retrieves a private first user key from a client and retrieves a public second user key from the secure virtual storage space. Furthermore, the device creates a datagram key from the private first user key and the public second user key. The device additionally encrypts the object key using the datagram key to generate a datagram. In addition, the device stores the datagram in the secure virtual storage space, where the datagram is stored as a second plurality of different randomized bit vectors stored in second plurality of storage servers in the secure virtual storage space. The device further sends a message to second user from first user indicating that the object and datagram are available to be read.

In one embodiment, the device reads an object shared from a first user to a second user stored on a secure virtual storage space. In this embodiment, the device receives a message for the second user from the first user indicating the object can be retrieved. In addition, the device retrieves a private second user key. The device further retrieves a public first user key from the secure virtual storage space. In addition, the device creates a datagram key from the private second user key and the public first user key. Furthermore, the device retrieves a datagram from the secure virtual storage space, where the datagram is stored as different randomized bit vectors stored in multiple storage servers in the secure virtual storage space. The device decrypts the datagram using the datagram key to generate an object key. The device further retrieves an encrypted object, where the encrypted is stored as different randomized bit vectors stored in multiple storage servers in the secure virtual storage space. The device decrypts the encrypted object using the object key and returns the object.

In a further embodiment, the device subdivides the device-encrypted index into multiple device-encrypted indexes each of manageable size and supplements the device-encrypted indexes with a server-side search index that allow searches of hashed search tokens. The server-side index of hashed encrypted tokens enables the server to indicate to the client which client-side device-encrypted indexes should be checked for possible search matches, so that the client need check only a subset of all the client-side device-encrypted indexes during a search. The use of the hash on the encrypted tokens greatly reduces the opportunities for frequency-based or adaptive attacks on the queries sent to the server and/or on the responses received from the server. In this embodiment, the device receives a search query that includes a sequence of tokens. The device encrypts the sequence of tokens and creates a sequence of hashed encrypted tokens using a second hash function. The device sends the sequence of hashed encrypted tokens to a search server as a query and receives a sequence of encrypted object names as a search result. The device determines a set of device-encrypted indexes to search by hashing the set of encrypted object names using a first hash function, the identifier of each device-encrypted index having been previously derived from the hash of each object name in the set of searchable objects. In addition, the device optionally decrypts the set of encrypted object names and searches the set of selected device-encrypted indexes for the search query while optionally restricting the search to the set of decrypted object names.

In another embodiment, a device searches encrypted objects stored in a secure virtual storage space. In this embodiment, the device receives a search query that includes a set of tokens and encrypts the set of tokens. The device further creates a hashed set of encrypted tokens using a second hash function. In addition, the device sends the hashed set of encrypted tokens to a first search server as a query. Furthermore, the device receives, from the first search server, a first set of encrypted object names as a search result. The device additionally determines a set of client-side indexes to search by hashing at least some of the first set of encrypted object names using a first hash function. The device further decrypts the set of encrypted object names. The additionally searches the set of client-side indexes using the set of decrypted object names.

In one embodiment, a device indexes an object in a server-side index. In this embodiment, the device receives an object and generates a set of tokens from the object by tokenizing the object. The device encrypts the set of tokens using a client private key or keys. The device additionally generates a set of hashed encrypted tokens using a hash function. Furthermore, the device encrypts the object name using a client private key. In addition, the device generates a set of server-side index entries for each of the set of hashed encrypted tokens, where each of the server-side index entries maps the hashed encrypted token to the encrypted object name. The device further sends the set of server-side entries to the server maintaining the server-side index.

In a further embodiment, a device indexes an object in a client-side index. In this embodiment, the device receives an object and encrypts an object name of the object using a client private key. The device further computes a hash of the encrypted object name. The device additionally selects one of a plurality of client-side indexes using the hashed encrypted object name, the result of the hash providing the client-side index identifier, and indexes the object in the selected client-side index.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
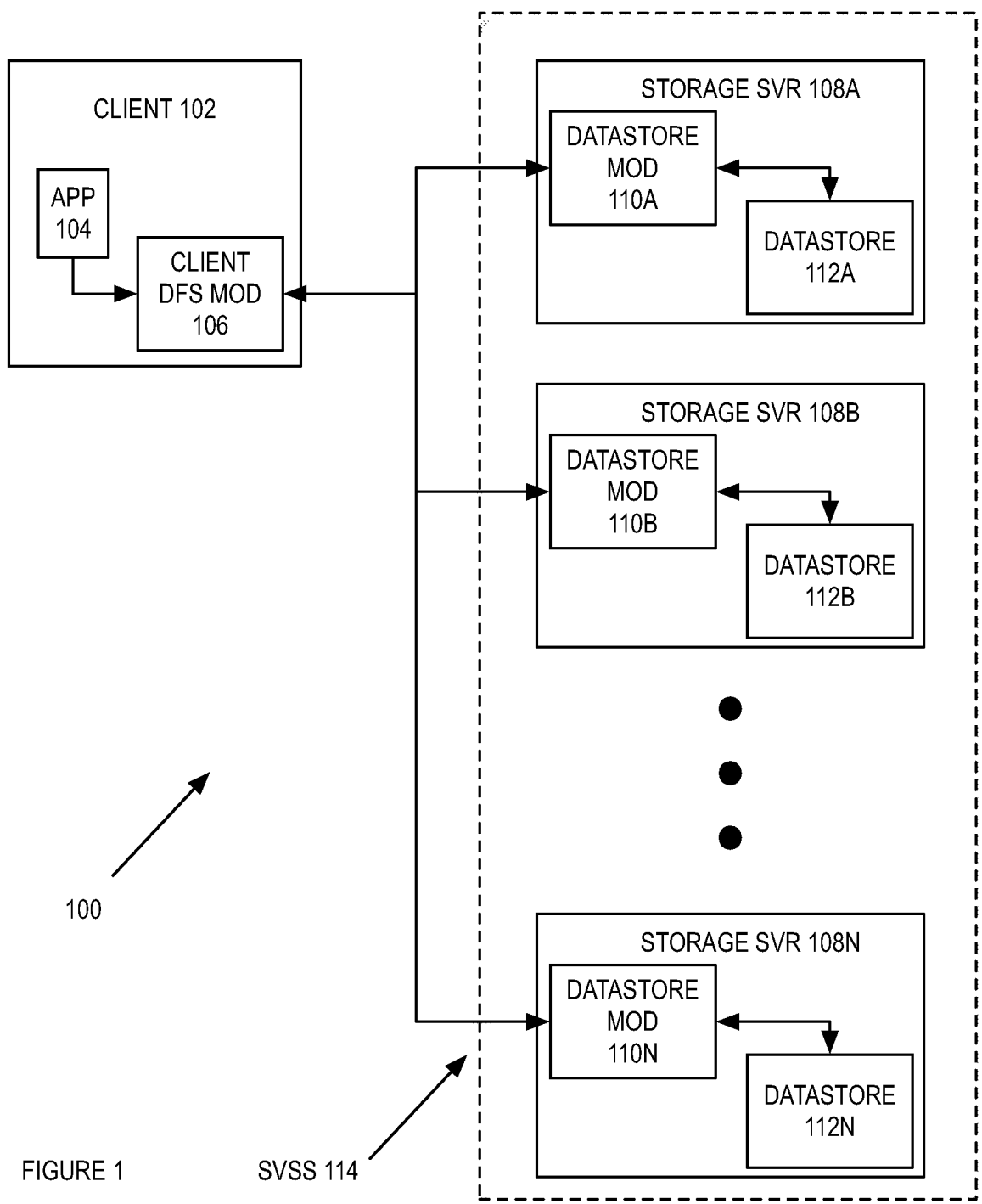
FIG. 1 is a block diagram of one embodiment of a system that returns stores an object by scattering parts of the object to different data servers.

A method and apparatus of a device that stores an object on a plurality of storage servers is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Secure Object Storing Through Data Scattering

The growth of "public cloud" (Amazon AWS, Microsoft Azure, Google Cloud etc.) has made it simple and cost-effective to gain access to data center storage capacity. At the same, there are concerns over who might have access to data stored in a shared or public data centers. Even where the data is stored in an encrypted form, concerns remain about where and how keys are stored and managed, how keys or communications might be compromised, etc.

In one embodiment, instead of storing an object on one server or multiple servers in one cloud service provider, the client spreads the data of the object thinly between multiple data centers (or multiple storage systems) to reduce the possibility that a compromise of one (or more) data center(s) does not compromise the object itself. For example and in one embodiment, the client creates a set of randomized bit vectors that are stored on multiple storage servers in multiple cloud service providers. Hereafter a "storage server" or "server" may be taken to mean either an individual physical server or storage subsystem, or a collection of servers or storage devices grouped together into a logical service. By spreading the data of the object across multiple servers in one or more cloud service providers, if one of servers or cloud service providers gets compromised by an attacker, the attacker would not have access to the rest of the data in the object. Furthermore, the client randomizes performs other operation the data in each of the bit vector, such that the data in each of the bit vectors likely does not contain meaningful data to an attacker.

FIG. 1 is a block diagram of one embodiment of a system 100 that stores an object by scattering parts of the object to different data servers. In FIG. 1, the system 100 includes a client 102 that is coupled to multiple data center servers 108 A-N through network (not illustrated). In one embodiment, each of the storage servers 108A-N is a collection of one or more servers that receives data store requests from client 102 and/or other devices. In one embodiment, the client 102 and/or each of the data center servers 108 A-N can be a personal computer, laptop, server, mobile device (e.g., smartphone, laptop, personal digital assistant, music playing device, gaming device, etc.), and/or any device capable making input/output requests. In one embodiment, the client 102 and/or each of the data center servers 108 A-N can be a physical or virtual device. In one embodiment, the smartphone can be a cellular telephone that is able to perform many functions of client 102.

In addition, each of the storage servers can be located with different cloud service providers. For example and in one embodiment, storage server 108A is located with cloud service provider A, storage server 108B is located with cloud service provider B, and so. In this example, each of the storage servers 108A-N can be located with a different cloud service provider so that the object is stored in N different cloud service providers if the object is stored on N storage servers. Alternatively, some or all of the storage servers 108A-N can be with one of the cloud service providers. In addition, one, some, or all of the storage servers 108A-N can be in different geographic locations.

In one embodiment, the client 102 includes application 104 that is coupled to a client distributed file system module 106. In this embodiment, the application 104 can read or write objects to the data center servers 108A-N through a client distributed file system module 106. The client distributed file system module 106 can write an object to the storage servers 108A-N by spreading the date of the object between these storage servers 108A-N. In one embodiment, the client distributive file system module 106 distributes the data of the object to these storage servers 108A-N by generating a set of bit vectors from the object and distributing these bit vectors to different ones of the storage servers 108A-N. In addition, the client distributed file system module 106 keeps track of which of the bit vectors are sent to which of the storage servers 108A-N and other metadata associated with storing the object in the storage servers 108A-N.

In one embodiment, the client 102 receives an object from the application 104 that is a sequence of bytes, with each byte being 8 bits wide. In this embodiment, the client generates 8 different bit vectors by distributing a different bit to the different bit vector. Furthermore, because each bit vector contains a single bit per byte, it is likely, though not certain, that no one bit vector contains much meaningful data from the file. The client 102 further randomizes each of the bit vectors using another bit vector that includes random data. The client 102 additionally sends each of the bit vectors, along with a half-key, to one of the storage servers 108A-N. In response to receiving one of the randomized bit vectors, the corresponding storage server 108A-N generates a full key from the received half-key and a server generated half-key. With the full key, the corresponding storage server 108A-N encrypts the received bit vector. The corresponding storage server 108A-N further deletes the received half-key and stores the encrypted bit vector and server half key in the data store of this storage server 108A-N. Writing of an object to the storage servers 108A-N is further described in FIGS. 2A-B and 3-5 below.

In a further embodiment, the client distributed file system module 106 can read an object from the storage servers 108A-N by retrieving the metadata for this object, determining which of the storage servers 108A-N has the data of the object, requesting this data from the corresponding storage servers 108A-N, and reassemble retrieved data into the object. In one embodiment, the client half-keys are stored at the client. Alternatively, the client can generate or re-generate the client's half-keys as needed. In this embodiment, the client could generate the client half-key from a non-reversible hash of the combination of the object key, the object identifier, and the vector number using a different seed to the one used for the bit-vector identifier. In one embodiment, the client could store both a local value at the client and when creating the half-key, the client combines the stored value with a hash derived from object key, the object identifier, and the vector number. Reading of an object from the storage servers 108A-N is further described in FIGS. 6 and 7 below.

In one embodiment, the collection of the storage servers 108A-N used to store an object is a secure virtual storage space 114. The secure virtual storage space can be used to read/write objects and share objects between users as well. In one embodiment, there can be different secure virtual storage spaces for the storage of different objects.

Figure 2A:
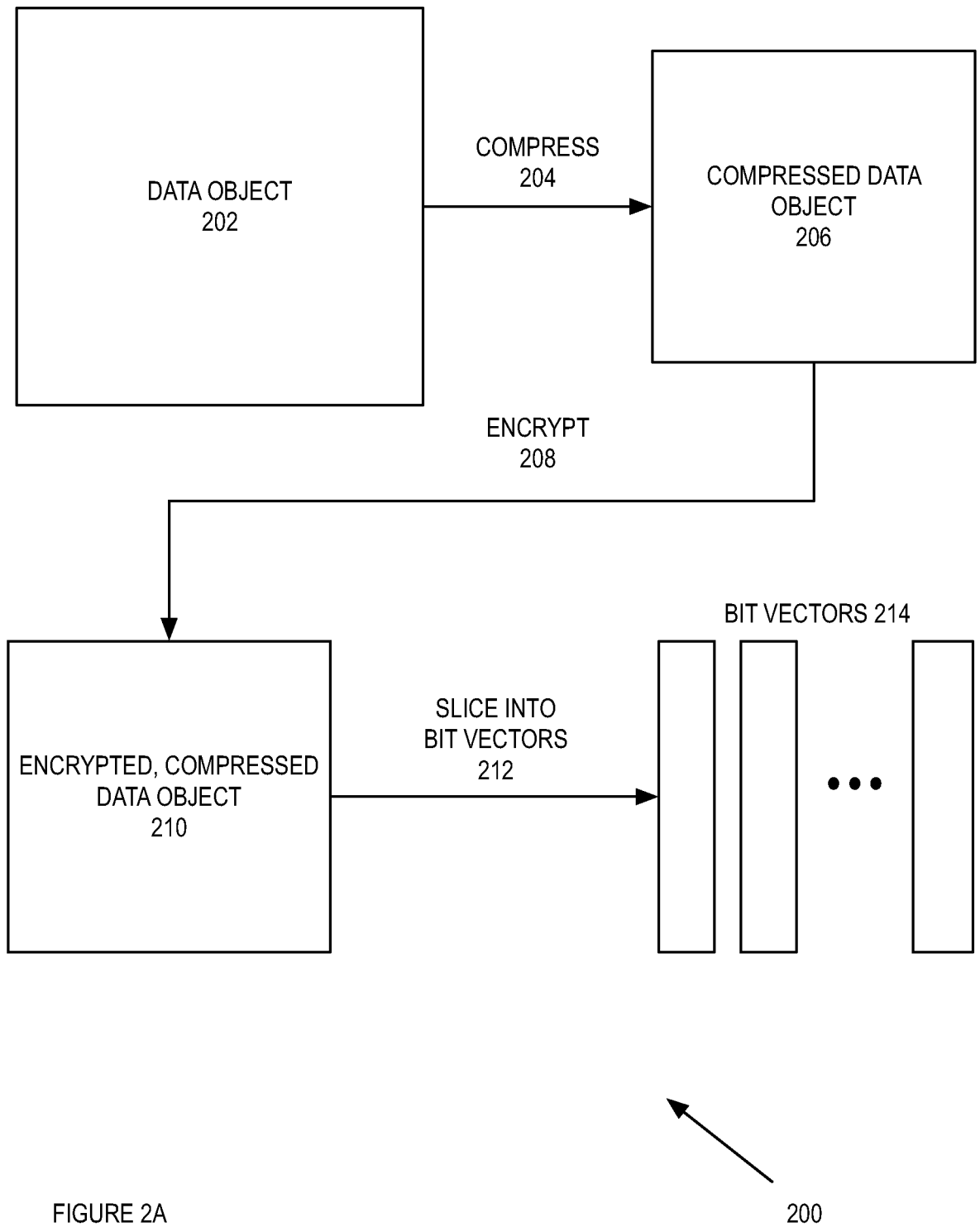
FIG. 2A is an illustration of one embodiment of partitioning an object into a set of bit vectors.

As described above, when a client writes an object, the client creates a set of bit vectors from the objects and scatters these bit vectors across multiple storage servers. FIG. 2A is an illustration of one embodiment of data flow 200 that partitions an object 202 into a set of bit vectors. In FIG. 2A, the data flow 200 includes a data object 202. In one embodiment, the data object 202 can be a document, image, file, video, audio, and/or any other type of object that can be stored in a storage system. In one embodiment, the client compresses the object (204) so as to remove extraneous data. For example and in one embodiment, the object is a file that sparsely represented the single letter "A" in ASCII with 8 bytes as follows:
  00000000
  00000001
  00000000
  00000000
  00000000
  00000000
  00000000
  00000001
In this example, each row is a byte of the file, with the most significant bit of each byte is on the left. Straightforwardly separating into bit vectors would produce (vectors shown vertically):

```
0 0 0 0 0 0 0 0
0 0 0 0 0 0 0 1
0 0 0 0 0 0 0 0
0 0 0 0 0 0 0 0
0 0 0 0 0 0 0 0
0 0 0 0 0 0 0 0
0 0 0 0 0 0 0 0
0 0 0 0 0 0 0 1
```

In this example, the vectors contain all zeros except the last, which contains: 01000001 (which is also the ASCII code for "A"). Because, in this example, each of the bit vectors except for the last bit vector has all zeroes. Thus, the data is not scattered among different storage servers. By compressing the object before separating into different bit vectors, there is a higher likelihood of the data being scattered. In one embodiment, the client compresses the file before separating into bit vectors. In this embodiment, the client could use a compression algorithm that is likely to ensure a high information density within the compressed form of the file. In this example, by ensuring high level of information density before the client scatters the data object 202, the client greatly increases the likelihood that individual bit vectors do not contain meaningful information.

The client, in one embodiment, encrypts (208) the compressed data object 206 to generate an encrypted compressed data object 210. In this embodiment, the encryption of the compressed data object is used to ensure that the individual bit vectors do not contain meaningful information without access to a key. In one embodiment, the key can be created by random number generator at the client, and is retained at the client. In one embodiment, by retaining the compressed data object key at the client an additional form of information dispersal is used. For example and in one embodiment, to reconstruct the object, an attacker would need to obtain all of the scattered bit vectors from the multiple storage servers and the key on the client.

In one embodiment, the client slices (212) the encrypted, compressed data object 210 into a set of bit vectors 214. In this embodiment, the client can slice up the encrypted, compressed data object 210 into two or more bit vectors. For example and in one embodiment, the client can create eight bit vectors by taking one of the bits from each of the bytes and the encrypted, compressed data object 210. While in one embodiment, the client generates eight bit vectors 214, in alternate embodiments, the client can generate more or less bit vectors. Furthermore, the client can generate the bit vectors using a different pattern to select the bits for the different bit vectors. For example and in one embodiment, rather than taking bit 8 for vector 8 for each byte, the bit chosen for vector 8 could change for each byte, such as based on a pseudo random sequence seeded by a client key. This is equivalent to bit-shuffling each byte before sending each bit to its respective vector.

Figure 2B:
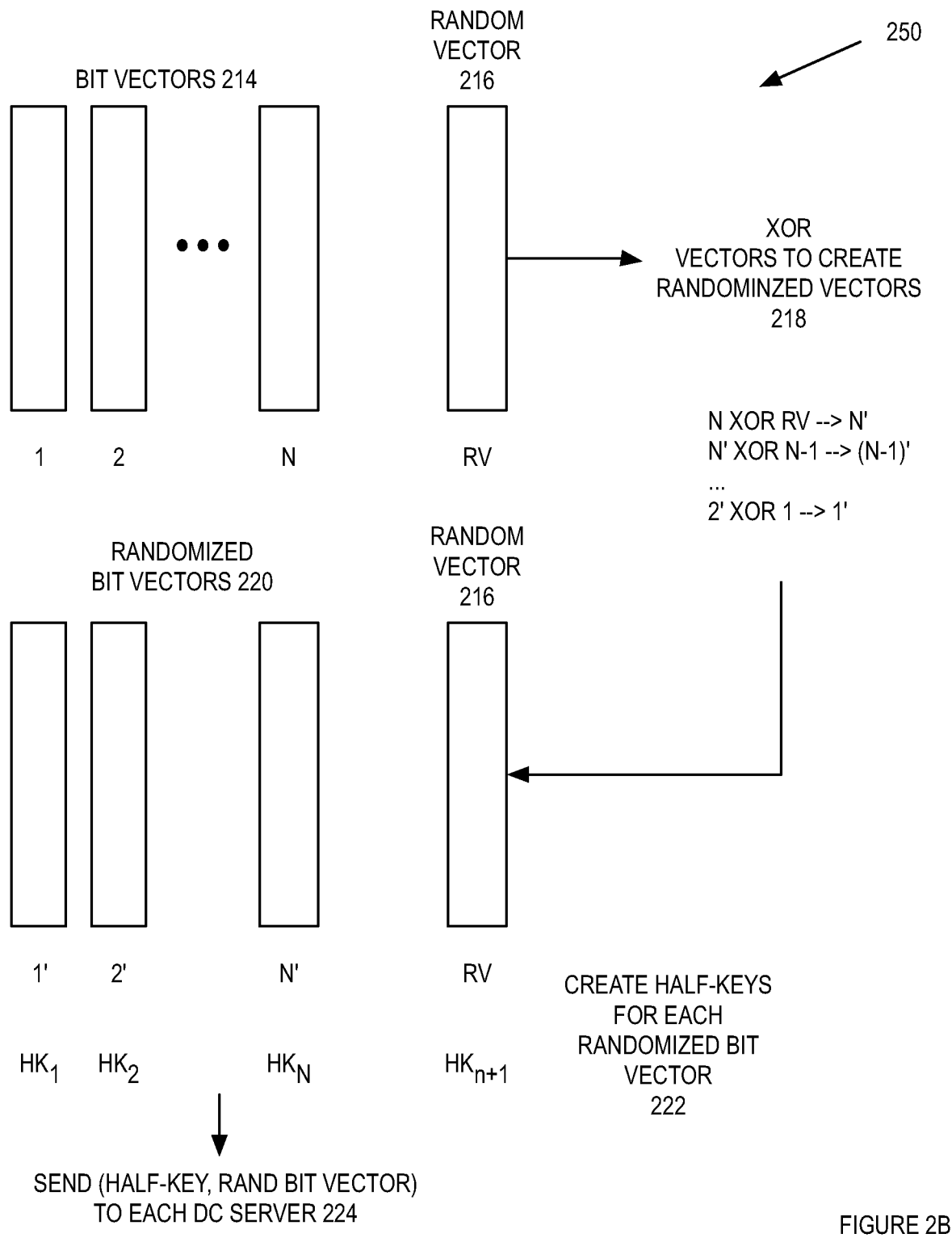
FIG. 2B is an illustration of one embodiment of randomizing the set of bit vectors.

FIG. 2B is an illustration of one embodiment of a data flow that randomizes the set of bit vectors. In FIG. 2B, the bit vectors 214 are randomized using a random vector 216. In one embodiment, the client creates the random vector 216 that is the same length of the bit vectors 214 and contains random data. The client further randomizes the bit vectors 214 using a function of the random vector 216 and the bit vectors 214. In one embodiment, the client sequentially (or cyclically) XOR the vectors, so as to generate a set of randomized bit vectors 220. For example and in one embodiment, the client can XOR the random vector 216 with the last bit vector, e.g., bit vector N. This generates a randomized bit vector N'. The client further XOR the randomized bit vector N' with the bit vector N−1 to generate a randomized bit vector (N−1)'. The client continues this pattern until the randomized bit vector 1' is generated. Alternatively, the client can initially XOR the bit vector 1 and the random vector 216 to generate a randomized bit vector 1'. The client would use the randomized bit vector 1' and XOR the bit vector 2 to generate the randomized bit vector 2'. In this example, the client would successively randomized XOR a randomized bit vector with an un-randomized bit vector to generate a new randomized bit vector, until the last randomized bit vector N' is generated. In a further embodiment, the client can initially select an un-randomized bit vector to XOR with the random vector 216. The client would then successively a randomized bit vector to XOR with an un-randomized bit vector to create a new randomized bit vector until the randomized bit vectors 220 is generated.

In one embodiment, the client further creates half keys for each of the randomized bit vectors 222. The client sends (224) one of the half keys with a corresponding randomized bit vector to a storage server. In one embodiment, the half keys are random data that is to be combined with a server half-key at the storage server to further encrypt the received randomized bit vector.

Figure 3:
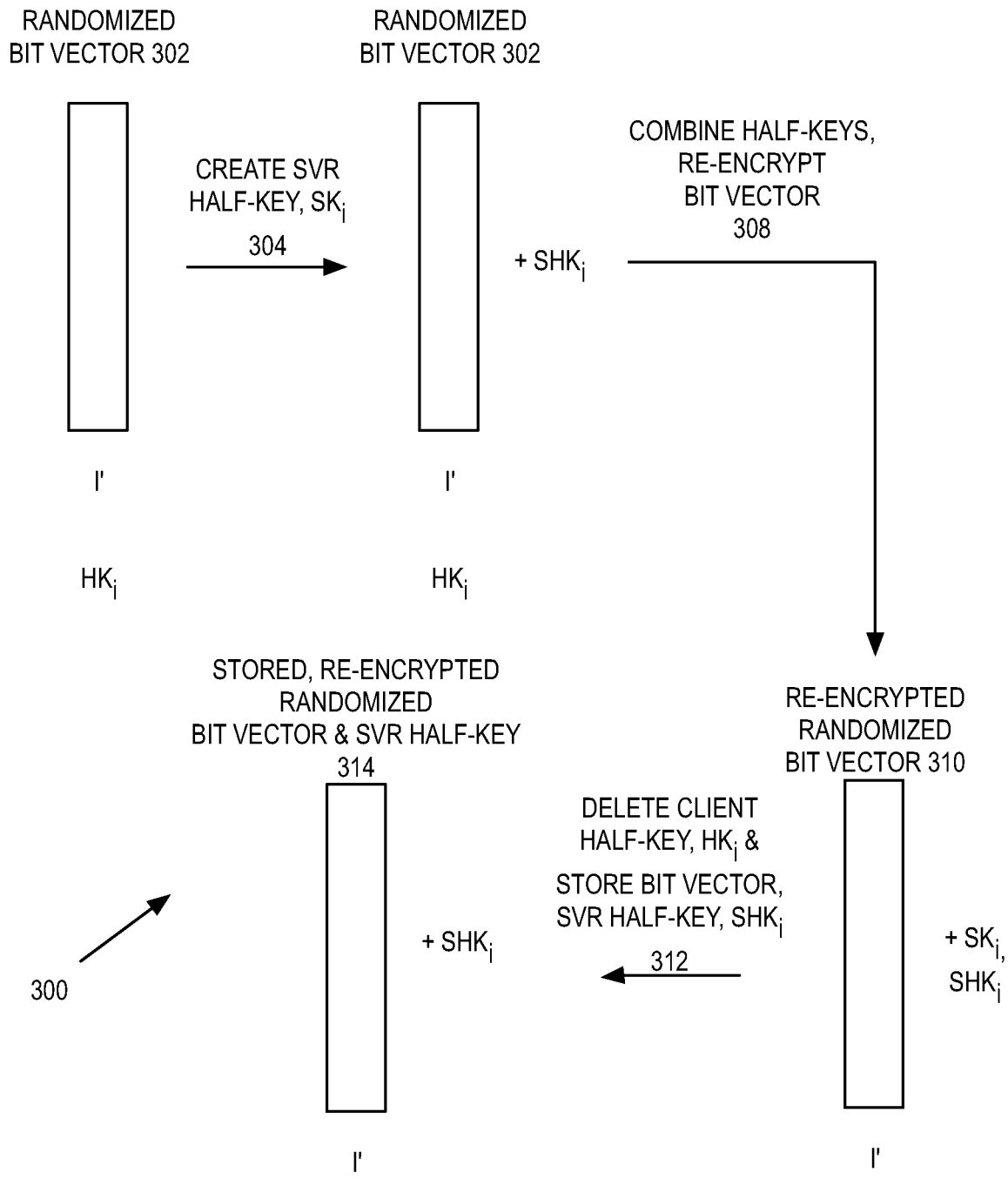
FIG. 3 is an illustration of one embodiment of storing a randomized bit vector and a server half key.

FIG. 3 is an illustration of one embodiment of a data flow 300 that stores a randomized bit vector and a server half key. In FIG. 3, the data flow 300 illustrates a storage server that receives a randomized bit factor 302 and a half key, $HK_i$, for the randomized bit vector 302. The storage server creates a server half key $SHK_i$ for the randomized bit vector (304). The server half key, $SHK_i$, is combined with the received key, $HK_i$, from the client to generate a server key, $SK_i$. The storage server re-encrypts the randomized bit vector 302 to generate a re-encrypted randomized bit factor 310. The storage server further deletes (312) the client half key, $HK_i$, and stores (314) the re-encrypted randomized bit vector 310 along with the server half key, $SHK_i$. In one embodiment, the storage server stores the re-encrypted randomized bit vector 310 and the server half key, $SHK_i$, in separate secure data stores of the storage server. By deleting the client half key, $HK_i$, if the storage server is compromised, the attacker would not have the full key to decrypt the re-encrypted randomized bit vector 310. This is because the client half-key, $HK_i$, on is stored on a different device as the server half key, $SHK_i$.

By storing the bit vectors on different storage servers, the client scatters the data of the object so that it is harder for an attacker recover the object. However, if one of the storage servers fails or is unreachable, the client may not be able to access the object. In one embodiment, the client can employ a server redundancy scheme to ensure there is a backup for one or more of scattered bit vectors. In one embodiment, the client creates an additional parity bit and storing this parity bit in an additional data center. This enables objects still to be read back in the event that one data center fails. Furthermore, by creating multiple additional bits to be stored in multiple additional data centers and using forward error correction (FEC), the client enables the object(s) still to be read even if multiple servers and/or data centers should fail. In one embodiment, data redundancy also enables: i) improved read performance, in that if only m retrievals from n servers are required for data reconstruction on read (m n) then the read completes once the fastest m retrievals are complete; and/or ii) improved write performance similarly—writes m+1 thru n can continue to completion in the background in parallel with new activity once writes 1 thru m have completed; and iii) superior protection against denial-of-service attacks in that in a denial-of-service scenario it is likely that some servers will be more severely affected than others, allowing the fastest subset to continue to offer timely service.

As described above, the client can scatter the bit vectors to multiple storage servers in multiple cloud service providers. In addition, the storage server can be in different geographic locations. In this embodiment, the more unlike one another the different data centers are, the greater the challenge posed to an attacker attempting to obtain access to all the data centers.

For example and in one embodiment, there may be additional protections in having data centers in different geographic locations; in different countries and/or different jurisdictions; with different system architectures; owned by different suppliers and/or managed independently. Moreover, for enterprise or government uses, it is also quite practical to have some of the data centers be internal and some in the public cloud. Note that this may increase security overall even if the internal data centers are less secure than the public ones, or vice versa, due to the additional diversity. In this example, more diversity makes it harder to hack all the data centers simultaneously, since a vulnerability in one data center is less likely to be found also in other data centers.

In one embodiment, not only object contents are meaningful—so are file and folder names. So, as in many secure systems, the client encrypts the object names as well as object content. Because the client is storing the bit-vectors in multiple different data centers, the client can exploit encrypted names of bit vectors to create an additional level of protection. The encrypted names are created using independent keys for each storage server. In one embodiment, the independent keys are independent because a bit vector name cannot be derived from the keys for the same encrypted name at other storage servers.

In addition, and in one embodiment, the client may also remove any bit-vector "fingerprint" that might reveal that two bit vectors at different data centers belong together: the bit-vectors are split into fixed length pieces, rounding up the length of each piece, and the timestamps on each piece are reset to meaningless values. Now, as soon as the client has a reasonable number of objects stored in the system, it becomes a substantial combinatorial problem to know which bit-vector pieces might be combined with which bit-vector pieces, across the data centers, in order to attempt a reassembly.

If the client scatters an object using N bit vectors to different storage servers in different cloud service providers, the client will login to the multiple (N+1) storage servers. The client uses an independent credential at for each storage server, so that if a credential is compromised in one storage server, a credential at another storage server need not be compromised.

In one embodiment, to avoid overburdening the user with remembering credentials, the client can store individual storage server credentials in an encrypted file at the client, with the credential file's encryption key being non-reversibly derived (e.g. SHA-256) at the client from a single master credential for the user available at login. In another embodiment, the client can non-reversibly derive individual storage server passwords from the user's master credential, again using a different salt for each data center, without the need to store anything at the client. In a further embodiment, the client can combine these two methods, combining a per-storage server key-mask stored locally in the encrypted file with a salted hash of the user's master credential, different salt per data center, to create the actual storage server credential.

In one embodiment, to further leverage the fact of using multiple independent storage servers, the client can use a two-stage approach where the client is able to pass a stage-1 login using above techniques, but then pulls additional masks from all of the storage servers, recombining them with the client-side credentials, in order to obtain the final credential for any data center; the point being that the user must successfully do a stage-1 authentication with every data center in order to then attempt a stage-2 authentication, and hence gain actual access, to any data center.

In traditional secure systems, there is often an "MAC" (Message Authentication Code) function that ensures authenticity (the writer of data is who they claim to be) and integrity (message not tampered with after being written). With respect to authenticity, the system may rely on the sender having a logged-in secure connection to the service; the service may additionally make use of secret codes installed at the client at setup time (if a sender isn't using the correct code, it suggests the user is an impostor, not the real sender).

In the scattered system as described in FIGS. 1, 2A-B and 3, the client is able to perform this whole process at each data center independently, analogously to the way the client exploits storage server independence during login. Effectively, each storage server is independently certifying the authenticity and integrity of each bit vector. Of course, an attacker would have to compromise authenticity/integrity at every storage server in order to present fake data to a user, since the user's client would reject any data for which any authenticity or integrity test failed for any bit vector.

Another form of attack in traditional secure systems is to "fake" the data center or storage server side, for instance by attacking DNS so that the user appears to be attached to a different site (a legitimate data center) to the one they are actually attached to (the attacker's data center). Again, the scattered-server approach has made such attacks hugely more difficult to execute—the attacker must successfully divert traffic to multiple independent data centers, not just one.

As described above, the client scatters the bit vectors to the different storage servers, where each of the storage servers re-encrypts that bit-vector at storage server before final storage. In one embodiment, the bit-vector encryption key will be formed from two masks. One, created at the client, is attached to the bit-vector read/write request; it is received by, but never stored at, the data center, and is stored securely at the client. The other mask is created at the data center; it is stored securely at the data center, but never sent to the client. The actual bit-vector encryption key is formed by combining the two masks (described as client and server half-keys below). If an attacker can get access to stored bit vectors at the data center, this attacker has two further challenges—the attacker must break into the secure store in each storage server holding the server-side key-mask; and the attacker must either compromise the client, or compromise the network or data center service such as that they can capture and retain individual client-generated masks as each request comes in, which the attacker must do so at every data center. Only then would the attacker have a chance to collect a set of bit-vectors; and, of course, even then the actual file is still protected by the client side file key (which was applied prior to splitting into bit-vectors).

As described above, the client can write an object as a set of randomized bit vectors stored in multiple storage servers.

Figure 4:
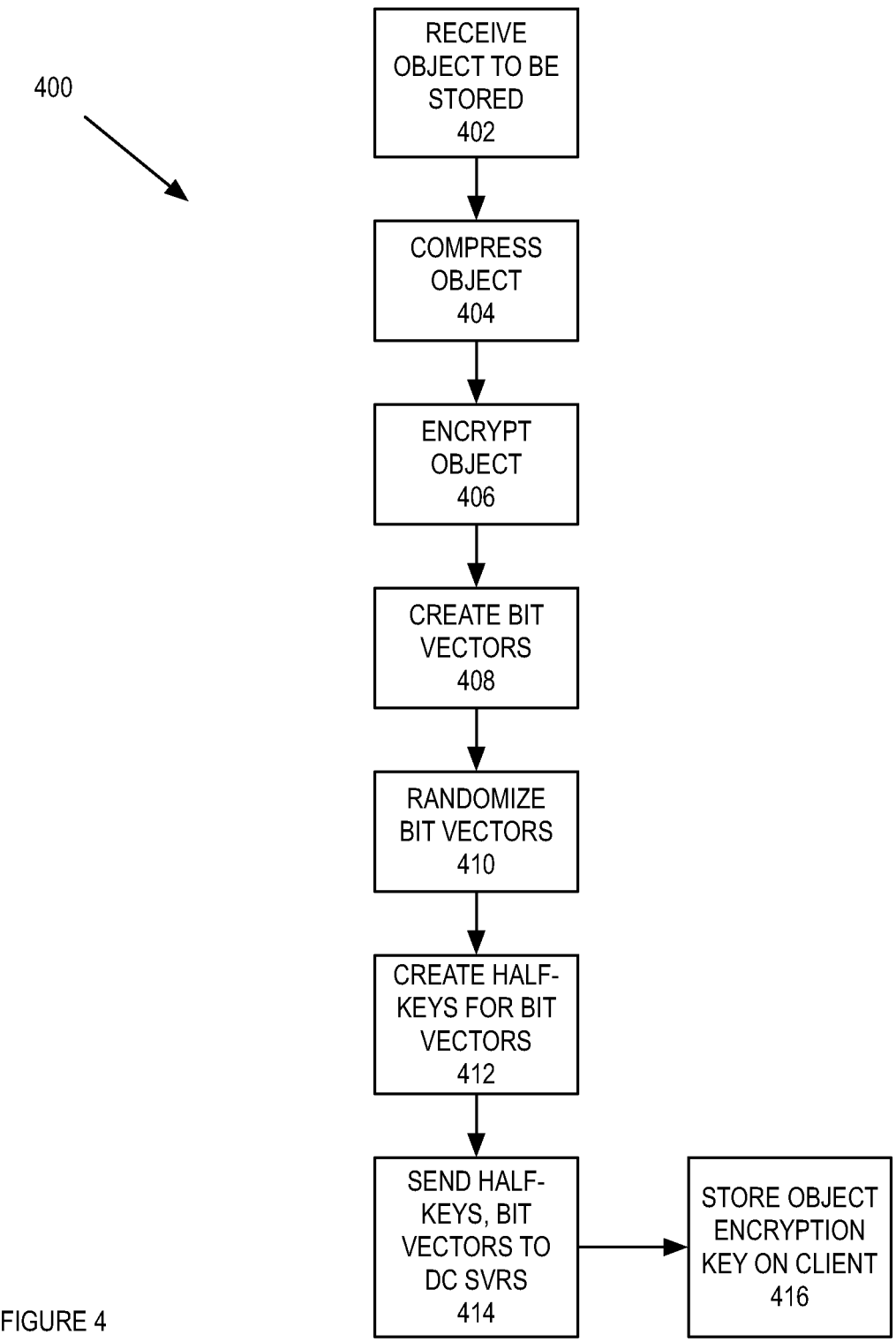
FIG. 4 is a flowchart of one embodiment of a process to store an object as a set of randomized bit vector stored in multiple data servers.

FIG. 4 is a flowchart of one embodiment of a process 400 to write an object as a set of randomized bit vector stored in multiple data servers. In FIG. 4, process 400 begins by receiving the object to be stored at block 402. In one embodiment, process 400 receives the object from an application that wishes to store the object over multiple storage servers. At block 404, process 400 compresses the object. In one embodiment, process 400 uses a compression algorithm that is likely to ensure a high information density within the compressed form of the object. By ensuring a high level of information density before process 400 scatters the object, process 400 greatly increases the likelihood that individual bit vectors do not contain meaningful information.

Process 400 encrypts the compressed object at block 406. In one embodiment, process 400 encrypts the compressed object so as to further ensure that the resultant individual bit vectors do not contain meaningful information without access to a key. In this embodiment, the key can be created by a random number generator and retained at the client. By retaining the key at the client, there is an additional form of information dispersal because to reconstruct the object and attacker would need to obtain all of the resulting scattered bit vectors from the multiple data centers and the key on the client.

At block 408, process 400 creates the bit vectors. In one embodiment, process 400 can create the bit vectors by selecting different bits of the object for different bit vectors. For example and in one embodiment, process 400 can create eight bit vectors by choosing a different bit of each byte of the object for a different one of the eight bit vectors. Alternatively, process 400 can use a different pattern of bit selection for creating the bit vectors.

Process 400 randomizes the bit vectors at block 410. By randomizing the bit vectors, process 400 further gives increases probability that each bit vector does not include meaningful data. In one embodiment, process 400 randomizes the bid vectors by creating an additional bit vector that is the same length of the other bit vectors and includes purely random data. Process 400 further uses this random data bit vector to create the set of randomized bit vectors. For example and in one embodiment, process 400 can XOR one of the un-randomized bit vectors with the random data bit vector to generate a randomized bit vector. Process 400 further XORs one of the randomized bit vectors with one of the un-randomized bit vectors. By repeating this process, the number of randomized bit vectors grows and the number of un-randomized bit vectors shrinks so that the set of un-randomized bit vectors is eventually converted into a corresponding set of randomized bit vectors. In one embodiment, process 400 can convert the set of un-randomized bit vectors into a set of randomized bit vectors as described in FIG. 2B above.

At block 412, process 400 creates half keys for the bit vectors. In one embodiment, each of the half keys is combined with a storage server half key to create a server key that is used by a storage server to compress one of the randomized bit vectors. Process 400 sends the half keys and the randomized bit vectors to the storage servers at block 414. In one embodiment, process 400 can send one of the half keys and one of the bit vectors to one of the multiple storage servers. For example and in one embodiment, for each unique combination of half key and bit vector, process 400 can send this unique combination of half key and bit vector to a different storage server, such that each of the storage server stores one of the half key, bit vector combinations. By scattering the half key, bit vector combinations to different storage servers, process 400 decreases the likelihood of an attacker gathering all of the bit vectors needed to reconstruct the object. In this example, process 400 can also use storage servers from different cloud service providers. As another example and embodiment, process 400 could create 8 half key, bit vector combinations and send these half key, bit vector combinations to eight different storage servers that are part of eight different cloud service providers. By sending these combinations to different cloud service providers, process 400 greatly reduces the likelihood of an attacker compromising all of the bit vectors needed to reconstruct the object. Alternatively, process 400 can send some of the half key, bit vector combinations to the same storage server and/or different storage servers within the same cloud service provider.

At block 416, process 400 stores the object encryption key on the client. In one embodiment, the object encryption key is the key used by process 400 to encrypt the compressed object at block 406. In addition, process 400 can securely store the bit vector half-keys on the client or on another device (e.g., other storage servers that do not store the bit vectors).

Figure 5:
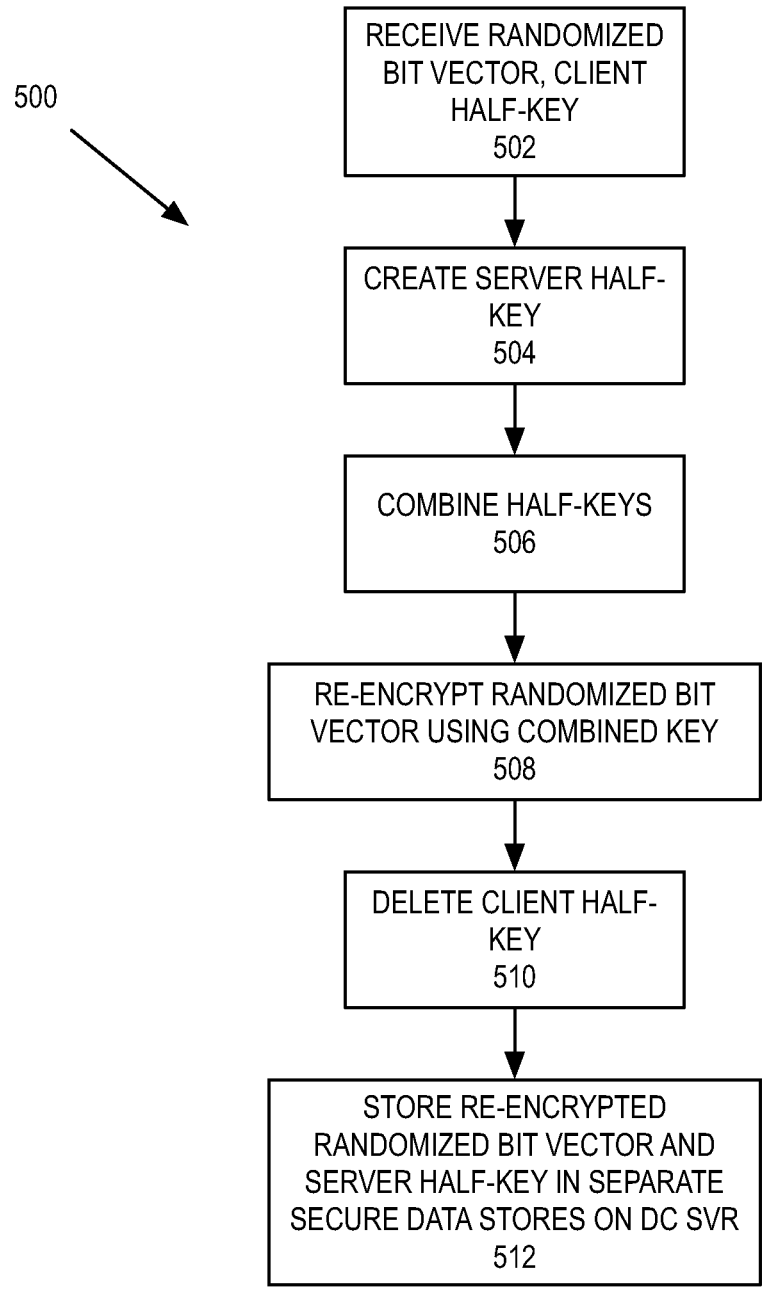
FIG. 5 is a flowchart of one embodiment of a process to store a bit vector on a data server.

As described in FIG. 4 above, process 400 sends a half-key, randomized bit vector combination to a storage server. This storage server receives the half-key, randomized bit vector combination and stores the bit vector in a data store of the storage server. FIG. 5 is a flowchart of one embodiment of a process 500 to store a bit vector on a storage server. In FIG. 5, process 500 begins by receiving the randomized bit vector and client have key at block 502. At block 504, process 500 creates a server half key. In one embodiment, process 500 creates the server half-key using a server-side random number generator. In one embodiment, the server half key is used with the client half key to create a server full key. At block 506, process 500 combines the client half key with the server half key to create a server full key. In one embodiment, process 500 appends the client half key to the server half key or vice versa. In another embodiment, process 500 creates the server half key by using a different function of the client half key and the server have key.

At block 508, process 500 re-encrypts the randomized bit vector using the server key. Process 500 deletes the client half key at block 510. But deleting the client half key, process 500 reduces the likelihood that an attacker that has compromised the storage server storing this re-encrypted randomized bit vector from being able to decrypt this bit vector as the parts of the key used to re-encrypt the randomized bit vector are stored on different devices. At block 512, process 500 stores the re-encrypted randomized bid vector and server half key in separate secure data stores on the stored server.

Figure 6:
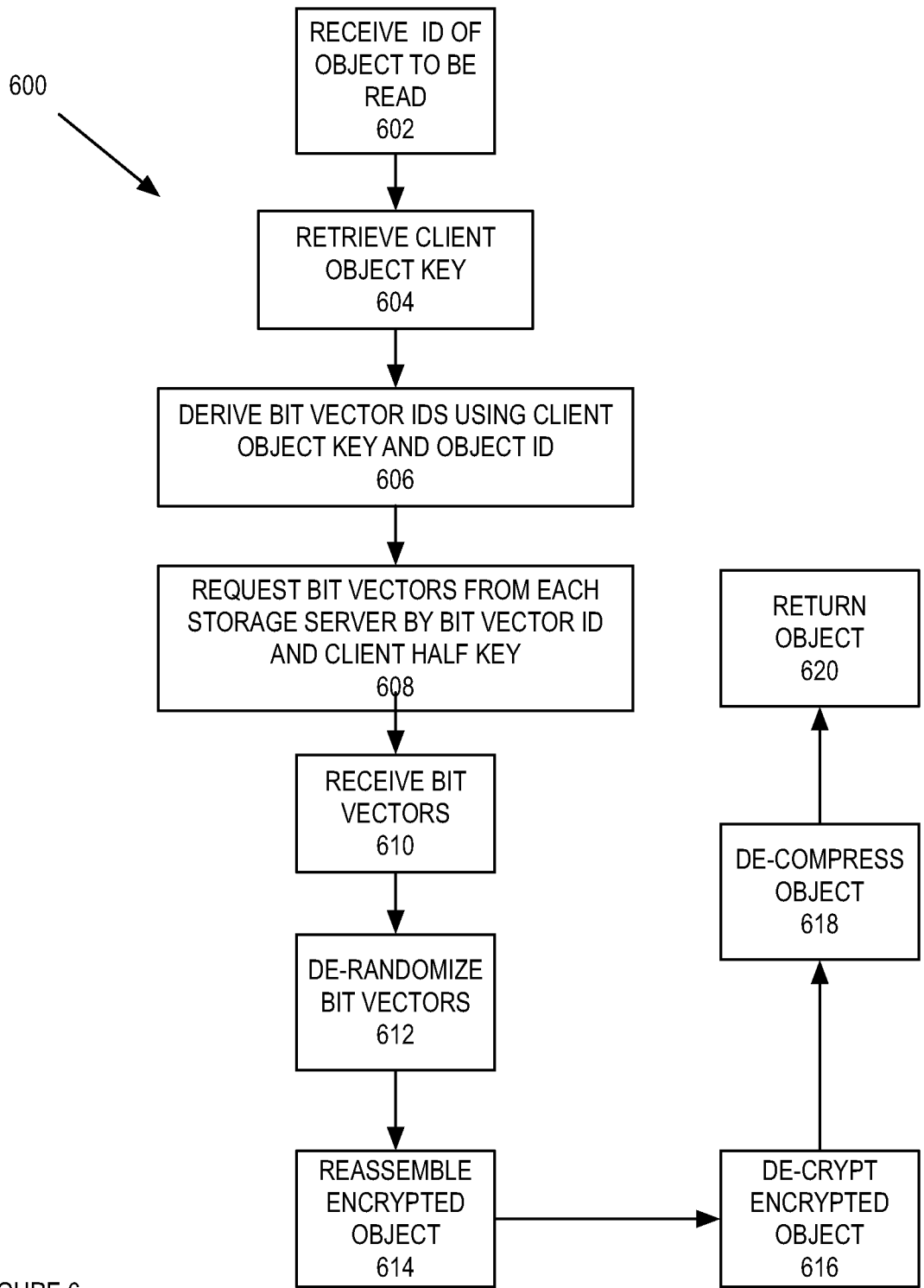
FIG. 6 is a flowchart of one embodiment of a process to read an object stored as a set of randomized bit vector across multiple data servers.

FIG. 6 is a flowchart of one embodiment of a process 600 to read an object stored as a set of randomized bit vector across multiple data servers. In FIG. 6, process 600 begins by receiving the identifier of the object to be read at block 602. In one embodiment, process 600 receives the object identifier from an application that wishes to read the object. At block 604, process 600 retrieves the client object key corresponding to the object identifier. In one embodiment, the client stores the client object key corresponding to the object identifier when the client stores the object scattered over multiple storage servers. Process 600 derives the bit vector IDs using the client object key and object identifier at block 606. In one embodiment, process 500 uses a non-reversible hash (SHA-3 256 or some other non-reversible hash) of the concatenation of the object key, the object identifier, and the vector number.

A block 608, process 600 requests the bit vectors from each of the storage servers by bit factor ID and client half key. In one embodiment, each of the storage servers retrieves the encrypted bit vector and server half key. The storage server further recreates the server full key using the received client half key and the stored server half key and decrypts the bit vector. In addition, the storage server deletes the client half key from the storage server and returns the bit vector to process 600. Process 600 de-randomizes the bit vectors at block 612. In one embodiment, process 600 receives the randomized bit vectors and the random data bit vector from the storage servers and applies the inverse operation to de-randomize the bit vectors. In this embodiment, process 600 generates a set of un-randomized bit vectors.

At block 614, process 400 reassembles encrypted object. In one embodiment, process 600 uses the pattern used to generate the un-randomized bit vectors from the encrypted object to assemble the encrypted object. Process 600 decrypts the encrypted object using the client object key at block 616. At block 618, process 600 decompresses is the object and returns the object of block 620.

Figure 7:
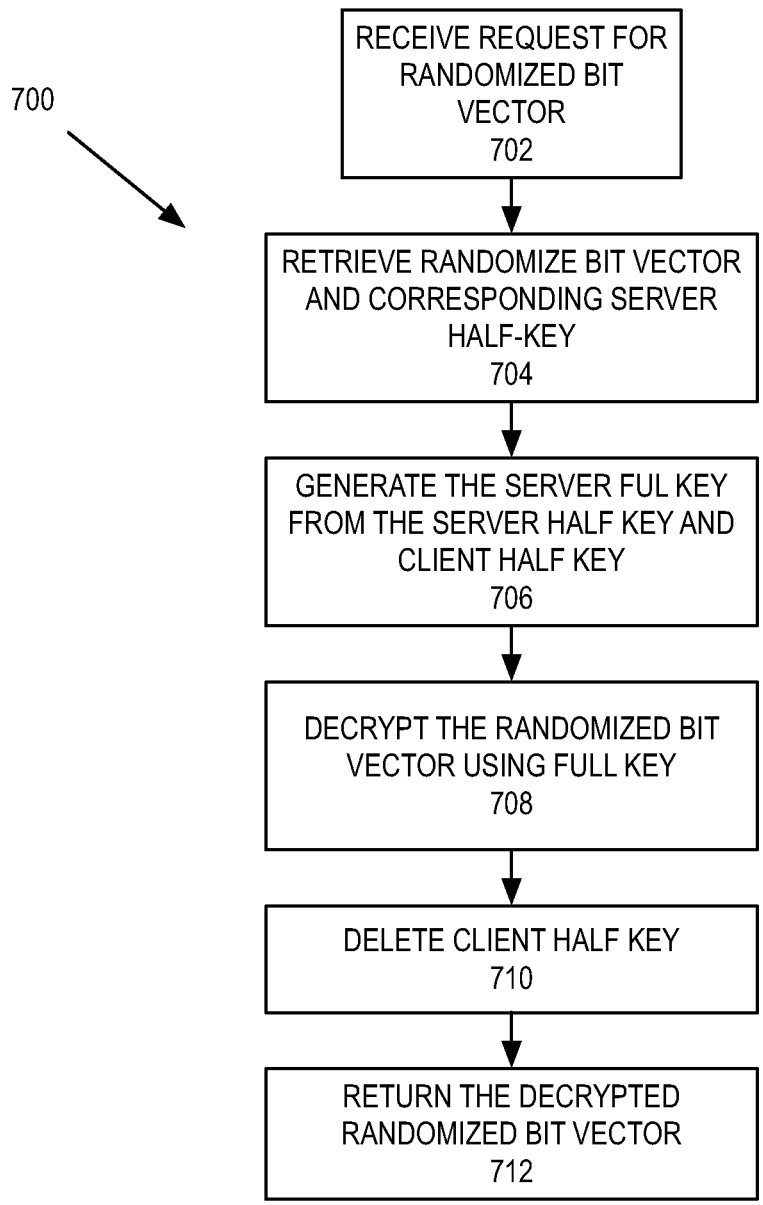
FIG. 7 is flowchart of one embodiment of a process to send a requested bit vector.

FIG. 7 is flowchart of one embodiment of a process 700 to send a requested bit vector. In FIG. 7, process 700 begins by receiving a request for a randomized bit vector at block 702. In one embodiment, the request includes the bit vector identifier and a client half key. At block 704, process 700 retrieves the randomized bit vector and corresponding server half key. Process 700 generates a server full key from the server half key and client half key at block 706. In one embodiment, process 700 combines the client half key with the server half key. At block 708, process 700 decrypts the randomized bit vector using the server full key. At block 710, process 700 deletes the client half key. Process 700 returns the decrypted randomized bit vector to the client at block 712.

Secure Communication, Collaboration and Search Via Shared Storage

Public Key Encryption (PKE) is widely used in communication systems today to enable a shared and accessible but insecure communication medium, such as the Internet, to be leveraged into an exchange of symmetric encryption keys allowing secure communication.

At a general level, PKE relies on user A and B being able to choose pairs of numbers, PubA and PrivA (chosen by user A), and PubB and PrivB (chosen by user B), together with an operator $\square$, such that $Pub_B \square Priv_A = Pub_A \square Priv_B$, with the properties that:

$Priv_A$ cannot be deduced from $Pub_A$ (and same for B), and $Pub_B \square Priv_A$ cannot be deduced even with possession of both $Pub_A$ and $Pub_B$.

Communication can then be established from user A to B by virtue of having user B publish $Pub_B$ while holding $Priv_B$ secure, and then user A sending a message encrypted using $Pub_B \square Priv_A$ (or secure derivative) as encryption key to user B with $Pub_A$ attached to the message (alternatively, user A can publish their $Pub_A$ rather than attaching it).

There is some method for user A to verify the identity authenticity of the publisher of $Pub_B$ and to verify the integrity of $Pub_B$ (e.g., it has not been tampered with since publication). In HTTPS this is done with the system of Certificate Authorities (CA) etc., with CA details being pre-installed in client devices (i.e. in the web browser). Similarly, authenticity and integrity must be established for any message sent and encrypted by sender using $Pub_B \square Priv_A$ or derivative as key.

Rather than use a certificate method, some secure communication systems work by having both user A and user B be logged on to a central service, passing the public keys via the central service, and having the central service verify user identity and (in some cases) key and message authenticity. Some secure text messaging services, such as Apple's iMessage, use such a technique.

As described above in FIG. 1, a secure virtual storage space can be created, in which any item of data is spread thinly (likely at the bit-vector level) across multiple data centers, with the virtual multi-data-center storage spaces being accessible by authenticated users. Each storage server requires independent authentication for logged on users. "Independent" means that the credential for one storage server cannot be derived from knowing the credentials at other data centers.

In one embodiment, each user (who wishes to be able to receive messages) publishes a public key into a virtual storage space, holding the corresponding private key on their device. User A, wishing to send a message to user B, pulls user B's public key from a shared virtual storage space, combines it with user A's private key, encrypts the message, and deposits the message in a shared virtual storage space. User B can then collect the encrypted message from the virtual storage space, and decrypt it using User A's public key which will either have been attached to the message or simply taken from a shared virtual storage space.

In one embodiment, the integrity of the published public user key (e.g. $Pub_A$ or $Pub_B$) is achieved by independently certifying each fragment of the public user key at each of the storage servers that together store this published key. In this embodiment, this is achieved by the publishing user having independent login and access credentials at each of the storage servers, and by the integrity check being based on that login and/or on a plurality of known certification tokens installed at the publishing user.

In one embodiment, the authenticity of the identity of the publishing user is achieved by independently certifying that user's identity at each of the storage servers that together store the published key. In this embodiment, this is achieved by the publishing user having independent login and access credentials at each of the storage servers, and by the authenticity check being based on that login and/or on a plurality of known certification tokens installed at the publishing user.

In one embodiment, the integrity of the transmitted datagram is achieved by independently certifying each fragment of the datagram at each of the storage servers that together store the datagram. In one embodiment, this is achieved by the sending user having independent login and access credentials at each of the storage servers, and by the integrity check being based on that login and/or on a plurality of known certification tokens installed at the sending user.

In one embodiment, the authenticity of the identity of the datagram-sending user is achieved by independently certifying that user's identity at each of the storage servers that together store the datagram. In this embodiment, this is achieved by the sending user having independent login and access credentials at each of the storage servers, and by the authenticity check being based on that login and/or on a plurality of known certification tokens installed at the sending user.

In this embodiment, because login credentials are independent at each storage server, an attacker trying to fake authenticity must "break" all of the data centers, not just one—since a client will reject any key or message that does not have authentic identity at every storage server. Similarly, "breaking" integrity of a message or key would require breaking it at every storage server in a coordinated fashion.

Each storage server independently ensures the authenticity and integrity of the "stripes" of data stored with them, where the original public key or encrypted inter-user message has been transformed into a set of stripes. The client accepts the key or message's authenticity and integrity if every stripe has authenticity and integrity.

Likewise, what applies for authenticity and integrity, also applies to gaining access to public key values and encrypted inter-user message content. To obtain unauthorized access to a public key, or to an encrypted message, an attacker must gain unauthorized access to all of the data centers, obtain the "stripes" for the item in question, reassemble the stripes, and compromise the client-side symmetric encryption key for the relevant shared space to enable decryption of the reassembled stripes.

Figure 8:
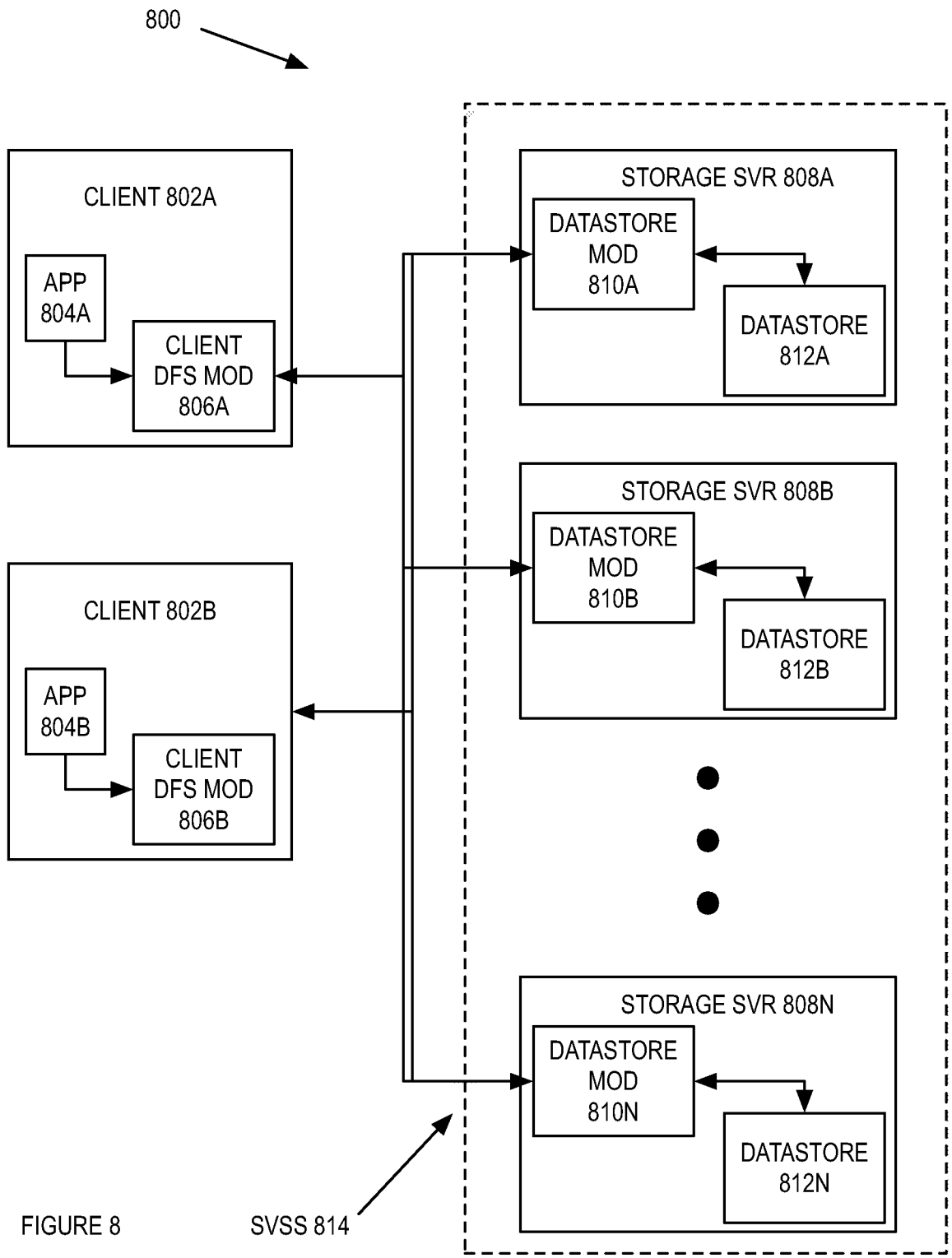
FIG. 8 is a block diagram of one embodiment of a system that returns shares an object between two clients by scattering parts of the object to different data servers.

FIG. 8 is a block diagram of one embodiment of a system 800 that shares an object between two clients 802A-B by scattering parts of the object and object key to different data servers. In FIG. 1, the system 800 includes clients 802A-B that are coupled to multiple data center servers 808 A-N through network (not illustrated). In one embodiment, each of the storage servers 808A-N is a collection of one or more servers that receives object share requests from client 802 and/or other devices. In one embodiment, each of the clients 802A-B and/or each of the data center servers 808 A-N can be a personal computer, laptop, server, mobile device (e.g., smartphone, laptop, personal digital assistant, music playing device, gaming device, etc.), and/or any device capable sharing objects. In one embodiment, each of the clients 802A-B and/or each of the data center servers 808 A-N can be a physical or virtual device. In one embodiment, the smartphone can be a cellular telephone that is able to perform many functions of clients 802A-B.

In addition, as in FIG. 1, each of the storage servers 808A-N can be located with different cloud service providers. For example and in one embodiment, storage server 808A is located with cloud service provider A, storage server 808B is located with cloud service provider B, and so. In this example, each of the storage servers 808A-N can be located with a different cloud service provider so that the object is stored in N different cloud service providers if the object is stored on N storage servers. Alternatively, some or all of the storage servers 808A-N can be with one of the cloud service providers. In addition, one, some, or all of the storage servers 808A-N can be in different geographic locations.

In one embodiment, the clients 802A-B each include an application 804 that is coupled to a client distributed file system module 806. In this embodiment, the applications 804A-B can be used to share objects to other clients using the storage servers 808A-N through a client distributed file system module 806. For example and in one embodiment, the applications 804A-B can be an email application, messages application, content creation application, social media application, and/or another type of application that might want to share objects between users.

In a further embodiment, a client 802A-B can share an object using a public key of another user that are published in the secure virtual storage space 814. In this embodiment, each of the users publishes public keys that can be used by another user to encrypt an object key that is used to encrypt the object. In one embodiment, the public and private keys to encrypt and decrypt the object are transmitted using PKE. For example and in one embodiment, if user A on client 802A wishes to share an object with user B on client 802B, client 802A encrypts the object using a private object key.

The client 802A additionally retrieves a public key for user B from the SVSS 814. Client 802A further retrieves a private key for user A and creates a new key from $Pub_B \square Priv_A$ (or secure derivative) as a datagram encryption key that is used to encrypt the object key to generate a datagram. Client 802A further stores the object and the datagram in the SVSS 814. In one embodiment, client 802A stores the shared object and/or datagram in the as described in FIGS. 2A-B and 3-5. The client 802A further sends a message to client 802B that the object (and datagram) is available to be read.

In another embodiment, the client 802B receives the message that the object (and datagram) is ready to be read. Client 802B determines the message is for an object shared by user A and retrieves the public key of user A ($Pub_A$); alternately, $Pub_A$ may be attached to the message. Client 802B further retrieves a private key for user B and creates a datagram key from $Pub_A \square Priv_B$ (or secure derivative) as encryption key that is used to decrypt the shared datagram. Client 802B further retrieves the shared datagram from the SVSS 814 and decrypts the datagram to generate an object key. The client 802B further retrieves the shared object from the SVSS 814 and decrypts the shared object using the object key. In one embodiment, client 802B reads the shared object in the as described in FIGS. 6 and 7.

In a further embodiment, the authenticity of the identity of users saving objects, and datagrams to the secure virtual shared storage space, and the integrity of objects and datagrams so saved, is certified independently at each of the storage servers that collectively makeup the virtual shared storage space. Thus, each of the storage servers certifies that data portion saved to that particular server together with the identity of the user doing the saving.

Figure 9A:
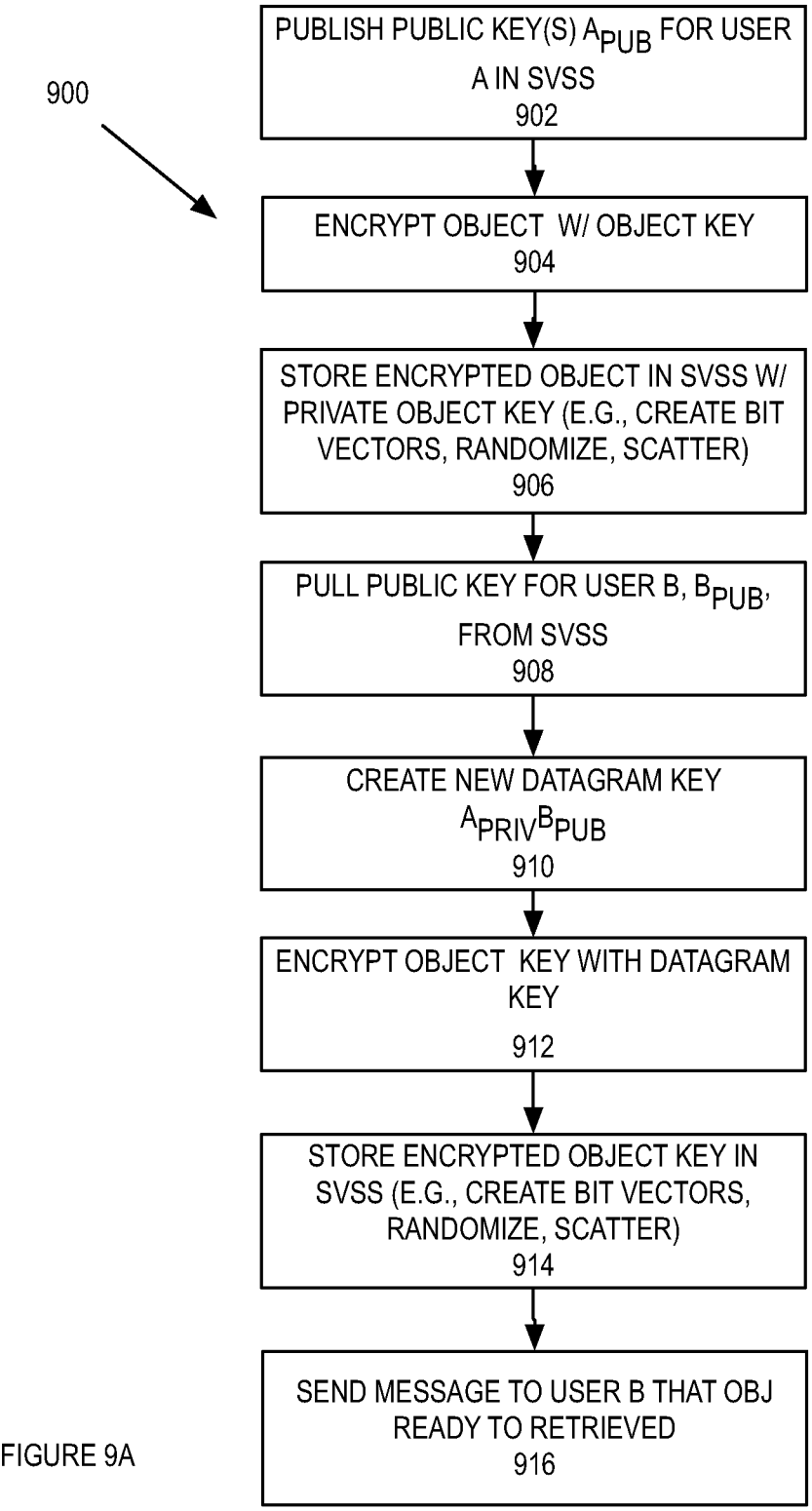
FIG. 9A is flowchart of one embodiment of a process to share an object from one user to another user.

FIG. 9A is flowchart of one embodiment of a process 900 to share an object from one user to another user. In FIG. 9A, process 900 begins by publishing public keys for user A, $Pub_A$, in the SVSS at block 902. In one embodiment, process 900 publishes the public keys into a known location in the SVSS, and both users A and B have access to that part of the space as a result of the login credentials for these users. In this embodiment, process 900 publishes the PKE public keys to the SVSS. At block 904, process 900 encrypts the object with private object key. In one embodiment, the object key is a private client-side symmetric key. Process 900 stores the object in the SVSS at block 906. In one embodiment, process 900 stores the object in the SVSS as described in FIGS. 2A-B and 3-5 above. At block 908, process 900 pulls the public key for user B, $Pub_B$, from the SVSS. In one embodiment, process 900 pulls the public PKE key of user B from the SVSS. Process 900 further creates a datagram key that is a combination of $Priv_A$ and $Pub_B$ at block 910. In one embodiment, process 900 creates the new datagram key using the operator □, such as encryption key $Pub_B \square Priv_A$. At block 912, process 900 encrypts the object key using the datagram key. Process 900 stores the datagram in the SVSS at block 914. In one embodiment, process 900 stores the datagram in the SVSS as described in FIGS. 2A-B and 3-5 above. Process 900 sends a message to user B that the object is ready to be retrieved at block 916.

Figure 9B:
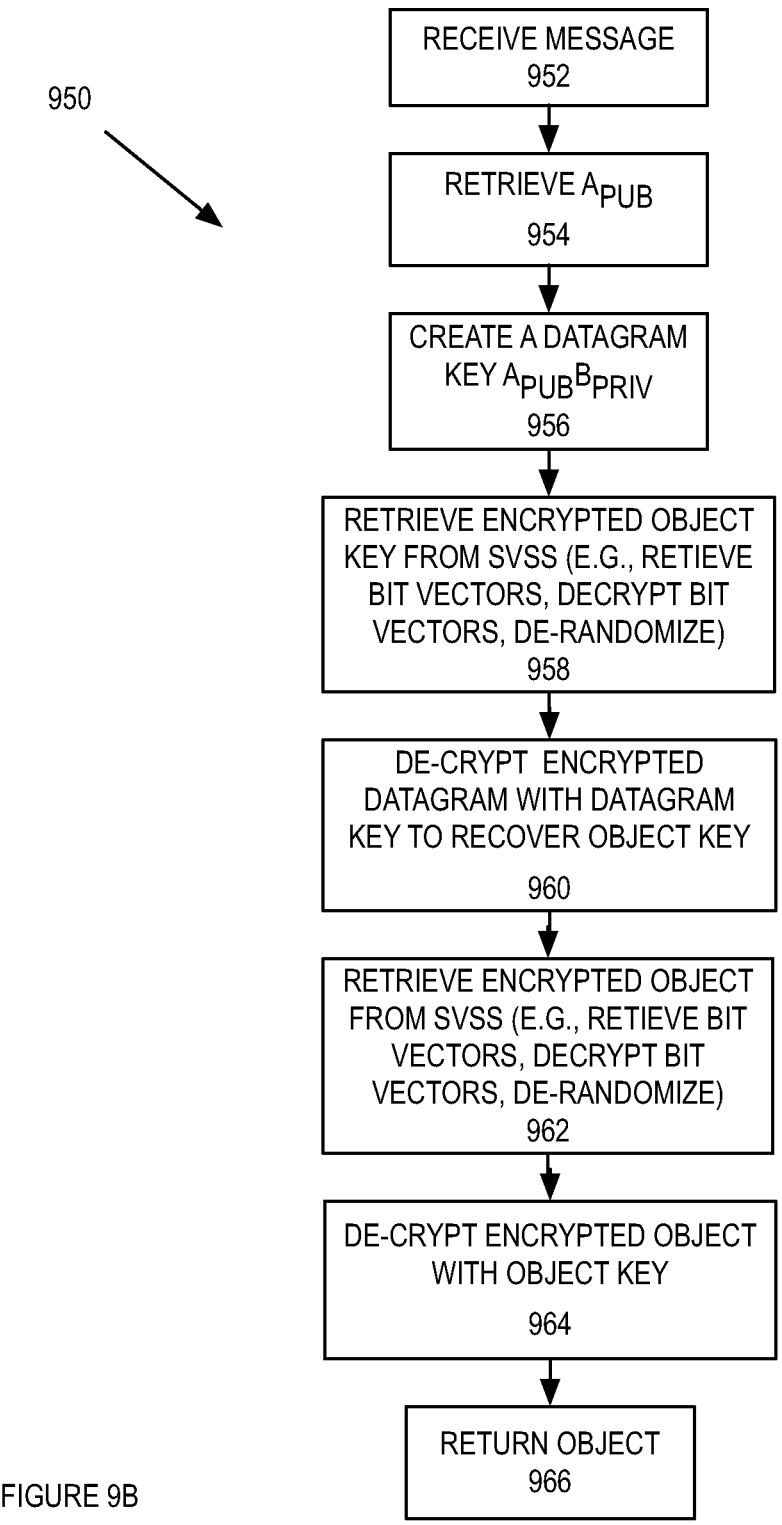
FIG. 9B is flowchart of one embodiment of a process to receive a shared object.

FIG. 9B is flowchart of one embodiment of a process 950 to receive a shared object. In FIG. 9B, process 950 begins by receiving a message that a shared object is ready to be read at block 952. At block 954, process 950 retrieves the public key for user A, $Pub_A$, from the SVSS. In one embodiment, process 950 retrieves the PKE public key. Process 950 further creates a datagram key that is a combination of $Priv_B$ and $Pub_A$ at block 956. In one embodiment, process 950 creates the datagram key using the operator □, such as encryption key $Pub_A \square Priv_B$. At block 958, process 950 retrieves the datagram in the SVSS. In one embodiment, process 950 stores the object in the SVSS as described in FIGS. 6 and 7 above. Process 950 decrypts the datagram with the datagram key to generate an object key at block 960. At block 962, process 950 retrieves the object in the SVSS. In one embodiment, process 950 retrieves the encrypted object in the SVSS as described in FIGS. 6 and 7 above. At block 964, process 950 decrypts the encrypted object using the object key. Process 900 returns the object at block 966.

In one embodiment, by "scattering" both sender and receiver public keys, the SVSS 814 is making hacking much harder, as the hacker has to compromise the whole set of storage subsystems/services of the SVSS 814. The scattering is combined with more conventional "message digest" techniques that also help to ensure the integrity of the published key (e.g., key has not been tampered with or replaced).

In one embodiment, a hacker can impersonate a user of the SVSS 814 so as to gain access to the SVSS 814. Ensuring identity of the sender and receiver is a core issue in conventional PKE systems. Specifically, the PKE system has to ensure that the public key associated with the sender really does belong to the claimed sender, and the public key associated with the receiver really does belong to the claimed receiver.

In one embodiment, a trusted administrator, with verified credentials and encryption keys on the SVSS 814, can create new users. In this embodiment, the user's identity is confirmed by four items: i) Username; ii) User-generated password; iii) memorable 4-word random machine-generated passphrase; and iv) random machine-generated passcode, with 3 letters followed by 20 digits. In one embodiment, the passphrase uses an adjective-noun-verb-adverb so as to make the passphrase more memorable. For example and in one embodiment, examples of the randomly generated can be: "political suggestion flaunts bitterly", "welcome heart twitters quickly", or "square desk chucks sternly". Other examples of the randomly generated passphrases can be used. In one embodiment, different forms of word types can be used (e.g., adjective-adjective-noun, adjective-noun-verb, noun-verb-adverb, adjective-noun, verb-adverb, noun-conjunction-noun, and/or other types of word patterns using strings of nouns, verbs, adjectives, adverbs, conjunctions, prepositions, acronyms, and/or word types in varying length strings).

In one embodiment, with the user's created credential, the user can be configured on a client, such as one or both of devices 802A-B. In this embodiment, so that the user does not have to enter the whole credential on subsequent logins on the trusted client device, a random machine generated short-form passcode is created. On login to the trusted client device, the user enters the user-selected password and the short-form passcode. The full credential is stored on the trusted client device using a key derived from the user-selected password plus the short-form passcode, so on login, the full credential can be obtained and used by the application.

In another embodiment, but with a possible loss of entropy, the first 3 letters of the short-form passcode can be consonant-vowel-consonant, to make the first three letters into a memorable phoneme. For example and in one embodiment, examples of the short-form passcode can be "MEJ 944 0637", "FOK 904 5140", or "SAW 655 4417". Other examples of the randomly generated passphrases can be used.

In another embodiment, and with an increased entropy, the 3-letters-and-7-digits can be replaced with a random machine-generated text of alternating consonant-vowel construct (e.g. MEJO KAWU KAS), where the alternating consonants and vowels are being used to improve memorability. In a further embodiment, the short-form passcode can be distinct for each trusted device, or common across trusted devices of that user.

In one embodiment, the stored full-credential can be a hash of the full credential and where said hash is used in the system in place of the full credential, rather than storing the actual originating full-credential on the trusted device. In a further embodiment, the long credential needed to access to the system can be a hash of the short-form credential joined with the locally-stored long form credential (or a hash of the short-form credential joined with a hash of the long form credential), so that breaking the encryption used for the locally-stored full-long form credential (or hash thereof) does not of itself yield the credential needed for system access, absent the short-form credential also. In another embodiment, and with a possible loss of entropy, the randomly generated passphrase can be wholly or partly alliterative.

In a further embodiment, the SVSS 814 can be protected by multi-level long-credentials, such that, for example, the short-form credential on a trusted device allows access to a long-form credential stored on device, and that long-form credential allows the retrieval from the SVSS 814 of a further credential that allows actual system access. Typically, the credential retrieved from SVSS 814 would be hashed again with short-form and long-form locally stored credential to produce the actual system-access credential. In this embodiment, even if a hacker can obtain illicit access to the locally stored long credential, the hacker cannot create the actual system-access credential (and hence derived encryption keys etc.) without actually logging in to SVSS 814 as well.

In one embodiment, on a trusted device, the application using the SVSS 814 could display to the user the long form credential upon entry of the short-form credential, so as to reduce the need or risk of users storing their long form credential in an insecure medium. In one embodiment, these techniques can be combined with other identity securing methods such as 2-factor-autherntication, one-time-passwords (OTP Auth), and/or other identity securing methods.

Client-Maintained Search Indexes with Server-Supported Symmetric Search Encryption In the most common search index applications, the index is stored in a central system and maintained by a central indexing function. When documents are added, changed or removed, the central indexing function will update the index. When a user wishes to search the index, they send their query to the central system, and the central system will return results. In such an application, the central system has access to all documents (at least temporarily at indexing time) and all indexes; and the original documents, or close replicas, can often be recreated solely from the indexes. If the documents being indexed are confidential, the user may wish to encrypt them before storing them in a central system. However, this renders them unsearchable unless the client also shares the encryption keys with the central system thereby exposing the documents to access by an attacker at the central system.

An alternate method has the client maintain the index, performing index update and search on the unencrypted index and decrypting/encrypting the index locally at the client on index read/write. This limits the index size to the number of documents able to be indexed and searched at the client, which in current technology might be a number ranging from, say, a hundred-thousand to as many as one billion; but at any rate it may be a small enough number as to constitute a real limitation for certain applications.

A second alternate method is to use Symmetric Search Encryption (SSE). In a simple view of SSE, for a given document being added or updated, the client creates index entries for the encrypted form of each of the terms found in the given document, each index entry referring back to an encrypted identifier for the document; and then the client sends those new/updated index entries to the central service for inclusion in the main index.

SSE thus allows the central service to search encrypted tokens of the terms used in the documents, rather than directly search for the document terms themselves; and the central service does not have to have the keys because it is mapping encrypted query terms to a set of encrypted document identifiers. Since the terms are encrypted, an attacker cannot directly reconstruct the documents from the indexes, and queries and results (including document identifiers) are not immediately visible to a successful attacker of the central service. However, due to word-frequency attacks, adaptive attacks, and other techniques, SSE cannot be considered fully secure, especially when it comes to securing queries and results.

Note that in the device-encrypted indexing scheme, the client is responsible for creating or updating index entries, which is presumed to be a lightweight-enough and/or infrequent-enough task as to be practical on a client device. On the other hand, the central service is responsible for storing and updating the centralized index, for running tokenized and encrypted search queries against the centralized index, and for returning encrypted results.

In one embodiment, a two phase search mechanism can be used, exploiting both a central-service-based SSE index and a number of only-searchable-at-the-client device-encrypted client-side indexes. In summary, on executing a search query: (1) the client uses an SSE query to determine which only-searchable-at-the-client client-side indexes might contain results; and (2) The client then loads the only-searchable-at-the-client client-side indexes, decrypts them using keys available to the client, and executes the search on the client-side.

In one embodiment, the client uses a hashing function that is:
  Concentrated, where the result domain is relatively small. For instance, hash(plainValue) for any value might produce a 10-bit result (i.e. 0≤hash(plainValue)≤1023).
  Well distributed on encrypted language/document content: For example, running the hash on a large set of encrypted unique terms or phrases produces a substantially evenly distributed results spread across the hash result domain, with no one hash result showing up significantly more or less frequent than any other.
  Good hash function in other respects: For example, fast to compute, infeasible to generate the source from the hash value, small change to source will likely produce an apparently unrelated hash result.

In another embodiment, the client uses two different hashing functions, $hash_1$ (for encrypted names/document identifiers) and $hash_2$ (for encrypted words and phrases). In this embodiment, $hash_1$ has result domain size of N and $hash_2$ has result domain size of M.

In one embodiment, the client maintains up to N client-side indexes. These indexes may be stored in some client-accessible off-client-device storage to avoid filling up the client storage with indexes, but nonetheless each index is encrypted by the client using a client-side key and is accessible only at the client; and, as a result, any search of the client-side index is executed at the client.

In a further embodiment, the device constructs device-encrypted search indexes storing them in a secure virtual storage space. The device can further share the index encryption keys 3 as described above with reference to FIGS. 8 and 9AB. Any device with the index encryption key and access to the secure virtual storage space may execute a search against the device-encrypted index, and may update the index upon a change to the indexed content. However, the device-encrypted index may not be accessed directly at the servers constituting the secure virtual storage space since the index encryption keys are available only at authorized clients.

Figure 10:
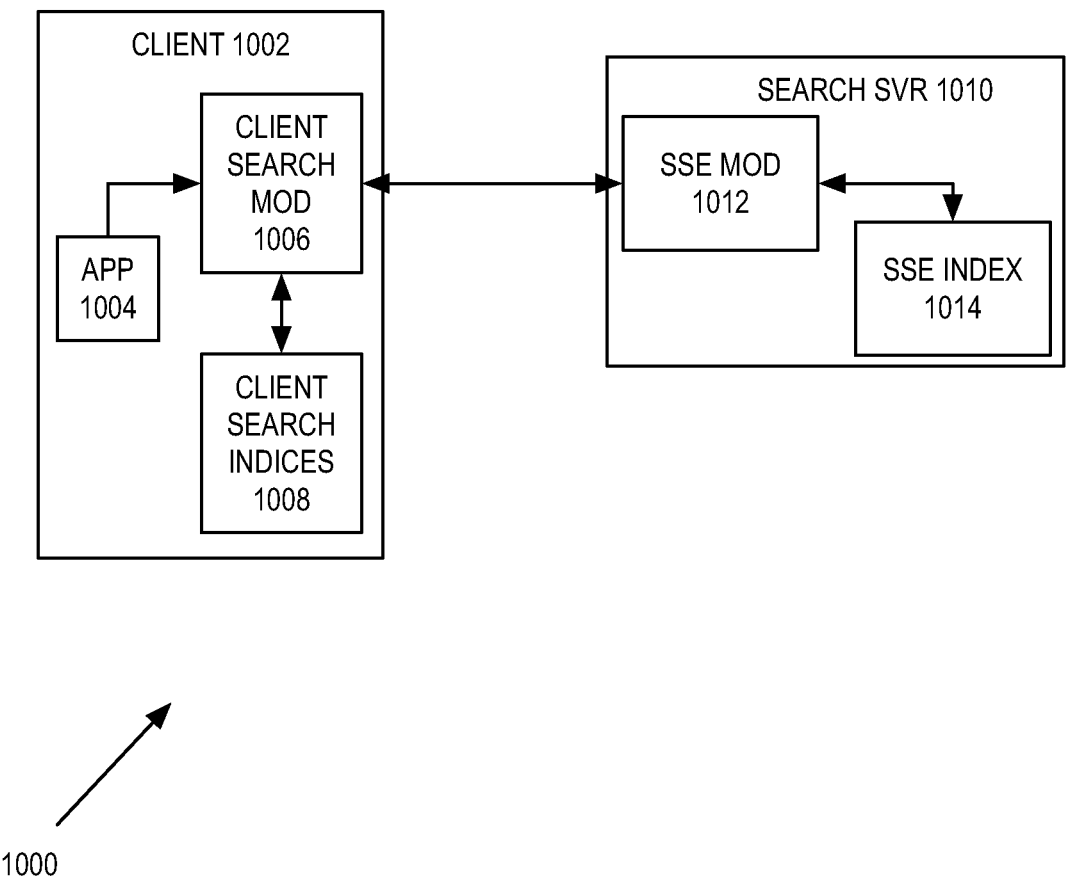
FIG. 10 is a block diagram of one embodiment of a system to search for objects using client-side and server-side indexes.

FIG. 10 is a block diagram of one embodiment of a system 1000 to search for objects using client-side and server-side indexes. In FIG. 10, system 1000 includes a client 1002 coupled to a search server 1010 through a network (not illustrated). In one embodiment, the search server 1010 is a collection of one or more servers that receives a search request from client 102 and/or other devices. In one embodiment, the client 102 and/or search server 1010 can be a personal computer, laptop, server, mobile device (e.g., smart phone, personal digital assistant, music playing device, gaming device, etc.) and/or any device capable of requesting a search and/or displaying search results. In one embodiment, the client 1002 and/or the search server 1010 can be a physical or virtual device. In one embodiment, the smart phone can be a cellular telephone that is able to perform many functions of the client 1002.

In one embodiment, the client 1002 includes an application 1004, client search module 1006, and client search indexes 1008. In one embodiment, the application 1004 is a running program that allows a user to input a search query. For example in one embodiment, application 1004 can be an object browser (e.g. searching for object stored in the file system, such SVSS as described in FIG. 1 above). Such an object browser includes a search input field that is used by the user to input the search query. In an alternative embodiment, the application 1004 can be another type of application that allows a user to input a search query, which is used to search on-device and/or off-device search domains. In one embodiment, the application 1004 includes a search input field, where the search input field is used by the user to input a search request string.

In this embodiment, the application 1004 sends a search query to client search module 1006. The client search module 1006 uses the search query to perform a hashed search using the SSE index 1014 on the search server 1010 and unhashed client search indexes 1008. Performing the search is further described in FIG. 13 below. Furthermore, the client search module 1006 maintains the client search indexes 1008 and index 1014. Maintaining the client search indexes 1008 is further described in FIG. 11 below. Maintaining the index 1014 on the search server 1010 is further described in FIG. 12 below.

In one embodiment, the search server 1010 includes SSE module 1012 and SSE index 1014. In this embodiment, the SSC module 1012 receives the search query from the client 1002 and performs search using that search query the SSC index 1014. Furthermore, the SSE index 1014 is an index where the index entries include an encrypted form of each of the terms found in a given object and each index entry refers back to an encrypted identifier for the object.

Figure 11:
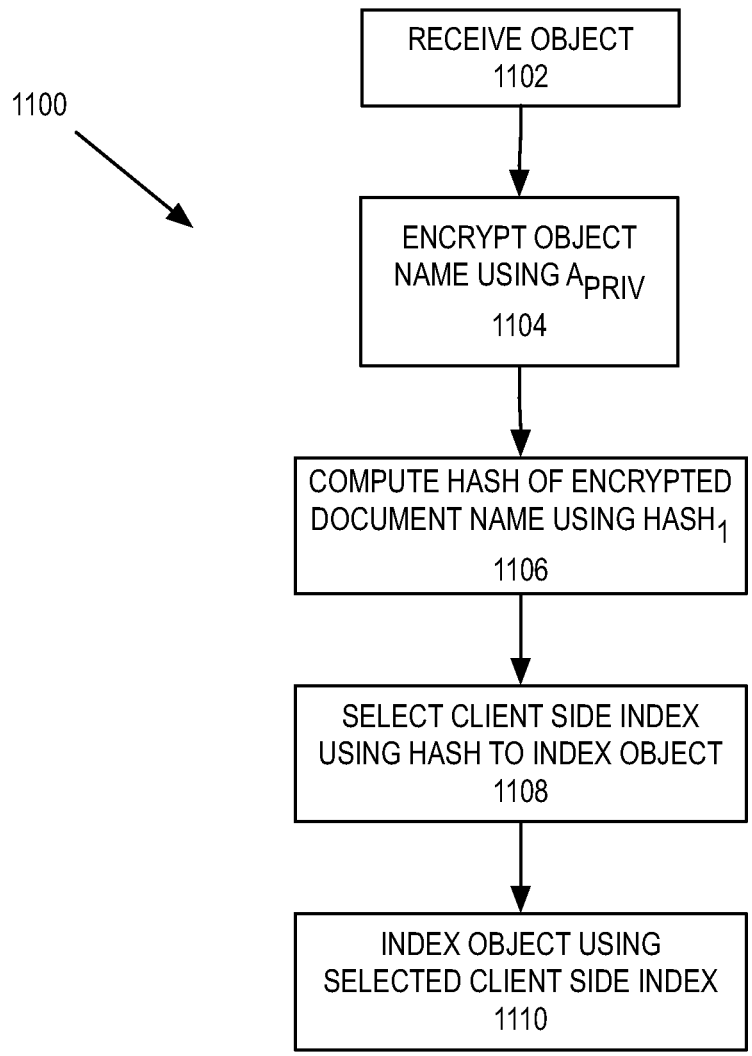
FIG. 11 is a flowchart of one embodiment of a process to index an object in multiple client-side indexes.

As described above, to execute a search using these search indexes, the client sends an SSE query to determine which only-searchable-at-the-client client-side indexes might contain results. The client then loads the only-searchable-at-the-client client-side indexes, decrypts them using keys only available to the client, and executes the search on the client-side. In order to use these indexes, the client maintains the client-side indexes and generates SSE index entries and sends these entries to the search server. FIG. 11 is a flowchart of one embodiment of a process 1100 to index an object in one or more of the multiple client-side indexes. In FIG. 11, process 1100 begins by receiving the object to be indexed in the client-side index at block 1102. At block 1104, process 1100 encrypts the object name using a private key of the user, $Priv_A$. Process 1100 computes a hash of the encrypted document name using $hash_1$. In one embodiment, the hash function used by process 1100 is a hash function that is concentrated, well distributed, and a good hash function for use in hashing encrypted object names. In this embodiment, process 1100 uses a hash function for encrypted object names and uses a different hash function for encrypted tokenized words and phrases. In one embodiment, at block 1108 process 1100 uses the value of the hash of the object identifier to determine which of the client-side indexes process 1100 will use to index the object. Process 1100 indexes the object using the selected client-side index at block 1110. In one embodiment, process 1100 indexes the object by storing the encrypted object name in the index entry.

Figure 12:
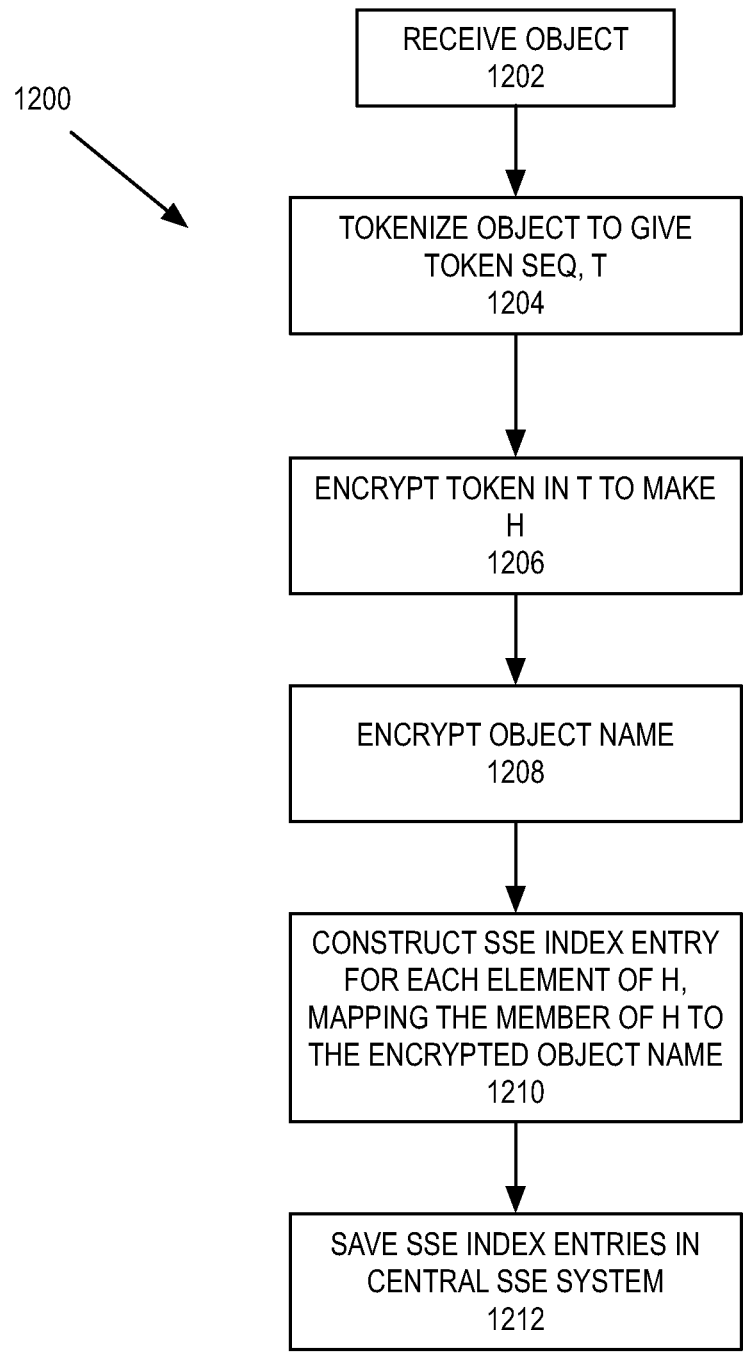
FIG. 12 is a flowchart of one embodiment of a process to index an object in server-side index.

FIG. 12 is a flowchart of one embodiment of a process 1200 to index an object in the server-side index. In FIG. 12, process 1200 begins by receiving the object of block 1202. Process 1200 tokenizes the object give a token sequence, T. In one embodiment, tokenization is a process of demarcating the strings included in the object to give the token sequence, T. In one embodiment, the token sequence, T is a set of words and/or phrases that are included in the object. At block 1206, process 1200 encrypts each token in T to make a sequence of encrypted tokens, H. In one embodiment, process 1100 can use one or more encryption keys to create the encrypted tokens, H. Process 1200 encrypts the object name at block 1208. At block 1210, process 1200 constructs and SSE index entry for each element of H, where each SSE index entry maps that member of H to the encrypted object name. Process 1200 saves the SSE index entries in the central SSE system at block 1210. In one embodiment, process 1200 sends the SSE index entries to the search server, where the search server incorporates the SSE index entries into the SSE index maintained by that search server.

Figure 13:
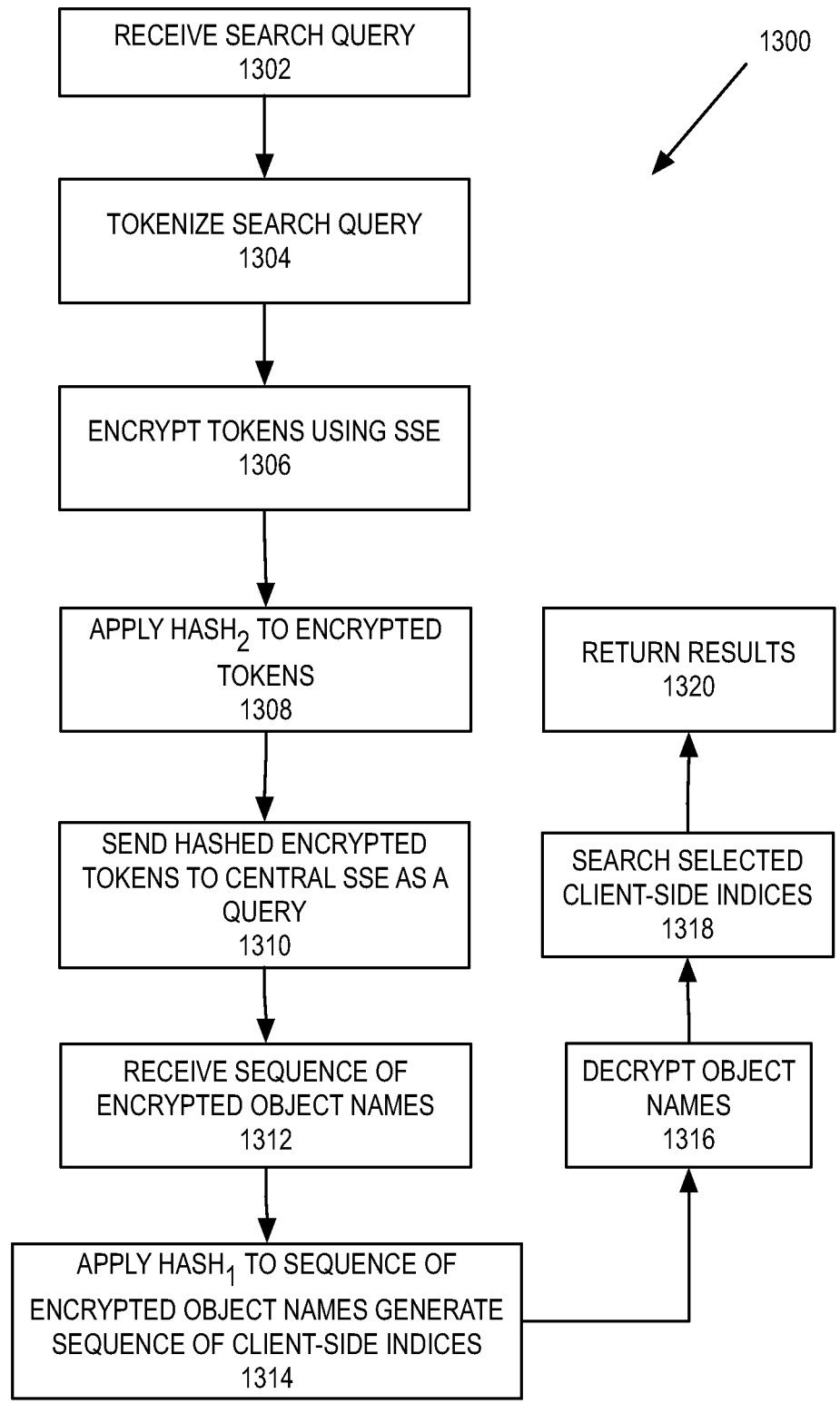
FIG. 13 is a flowchart of one embodiment of a process to search for objects using client-side and server-side indexes.

With the client-side indexes and the SSE index on the search server, the client can receive and service search requests. FIG. 13 is a flowchart of one embodiment of a process 1300 to search for objects using client-side and server-side indexes. In FIG. 13, process 1300 receives search query that block 1302. In one embodiment, a search query is free text indicating what the user wishes to search. In another embodiment, the search query can be in a different form (e.g., spoken query, structured query, and/or another type of query). At block 1304, process 1300 tokenized as the search query. In one embodiment, tokenizing the search query generates a set of tokens that are in the search query. Process 1300 encrypts the tokens at block 1306. In one embodiment, process 1300 can use one or more encryption keys to encrypt the tokens. At block 1308, process 1300 applies a hash function, $hash_2$, to the encrypted tokens. In one embodiment, the hash function used by process 1300 is a hash function that is concentrated, well distributed, and a good hash function for use in hashing encrypted words and phrases.

Process 1300 sends the hashed encrypted tokens to the search server as a query at block 1310. In one embodiment, the search server will receive the hashed encrypted tokens and perform a search query using the SSE index that is maintained by the search server. In this embodiment, the search server will generate a set of search results and send these search results back to the client as a sequence of encrypted object names. At block 1312, process 1300 receives the sequence of encrypted object names from the search server. Process 1300 applies the $hash_1$ hash function to the sequence of encrypted object names to generate a sequence of client-side indexes. Process 1300 decrypts the object names at block 1316. With the decrypted object names, process 1300 searches the selected client-side indexes for the search query restricting the search to the set of object names. At block 1320, process 1300 determines and returns the search results.

In one embodiment, the server-side indexes have much less information in them as compared with a traditional SSE system. In this embodiment, this greatly reduces what might be deduced by a successful attack on the search server, because the search server will have the hashed encrypted tokens (where the hash is highly concentrated) and not the encrypted tokens themselves. Furthermore, the search query received by the search system would have the hashed encrypted tokens. Because this hash is of encrypted tokens, an attacker (presuming they have not compromised the token encryption key) cannot know which sets of words map to a particular hash value. If the attacker mounts a frequency counting attack, there is no way to know which set of words map to the observed hash value frequency—whereas in regular SSE knowing the relative frequency of a given token (which maps to a single unencrypted word) can give a very strong clue as to the corresponding unencrypted word.

In one embodiment, in a typical search system, a variety of metadata may be stored with each search index entry (e.g., position of match(es) in the document, surrounding snippet, and/or other types of metadata).

In the two-phase search described in FIGS. 10-13, almost all of the metadata can be excluded from the SSE index, and held solely in the client-side indexes. For example and in one embodiment, it is not necessary for the modified SSE system running on the search server as described in FIGS. 10-13 to know the number of times an items maps to a document, nor the positions.

In one embodiment, there could be some relevance score computed at the client (perhaps along with other possible result sorting metrics), which will be shared with SSE so that the search server has some means of ordering its search results. The sorting may be necessary if the search server is returning the highest scoring results, or is returning results in pages with highest scoring results first.

In one embodiment, the relevance of SSE results using hashes as described in FIGS. 10-13 above will be weaker than in conventional SSE, because the search server knows that one of a set of tokens (corresponding to the hash value query) has matched the search query, but the search server does not know whether the original token causing the match was the highest relevance in the set, the lowest, or somewhere in between. In this embodiment, an SSE sorting algorithm used by the search server could assign a relevance score to the result that was the mean of the relevance scores of the original tokens, the highest, the mean plus one standard deviation, or something way of assigning a relevance score.

Alternatively, the search server can use a sorting method that is specified by the client on a per-query basis. Because the relevance will be weaker than in conventional SSE, the search server may need to return a larger result set and allow the client to re-sort according to the relevance scores of individual matches in the client-side indexes. The search server can also include server-side relevance scores in the returned result set, helping the client to make its own determination of how deep in the SSE result set to search in the client-side indexes.

As described above in FIGS. 10-13, the SSE index maintained by the search server maps hashed encrypted tokens to encrypted document names. Alternately, this SSE index can map hashed encrypted tokens to hashed encrypted document names. This may provide additional protection since then an attacker will not know which hashed encrypted tokens belong together in a single document, since the hashed encrypted document name will not be unique per document, unlike the (unhashed) encrypted document name.

In a further embodiment, the client could use the $hash_1$ hash function for hashing the names for SSE, just as the client uses $hash_1$ hash function for manufacturing the names of the client-side indexes. In this embodiment, if using $hash_1$ results for the SSE index, the client could apply an additional encryption to the $hash_1$ result to get the client-side index name using a key known only to the client.

In one embodiment, using hashed encrypted document names in the SSE index would prevent an attacker deducing the approximate length of a given document based on the number of hashed encrypted tokens pointing to the encrypted document name (since many encrypted document names would result in the same hash). Consequently, this would reduce any risk of an attacker trying to mount a frequency-based attack on short documents. Using hashed encrypted document names in the SSE index would also prevent an attacker who has compromised the client's document name encryption from getting names from the index because the hash would be too concentrated.

In a further embodiment, both SSE-indexes and client-side indexes could be subdivided by time, typically by the time of the most recent update of each document. In this embodiment, time dividing these indexes would allow for matched client-side search indexes to be smaller, since now the client side indexation would be subdivided not only by the hash of the encrypted document name but also by the time-range of the most recent update. Provided the time ranges were wide enough, the additional security impact should be acceptable.

In another embodiment, the client could maintain independently two (or more) search server systems as described above using different $hash_2$ functions for the mapping of hashed encrypted tokens to object names, call them $hash_2$ and $hash_2'$. The functions would be chosen to reduce the likelihood that $hash_2(x)=hash_2'(y)$ unless x=y. During the SSE phase of processing a query, the client would send queries to each of the two different search servers and get back two result sets from the two SSE systems on the different search servers. The client would take the intersection of the two result sets, to produce the set of document names/identifiers to search in the client-side indexes. By using independent $hash_2$ functions, the client can ensure that the intersection is much smaller than either of the SSE result sets, reducing the client load, because there will be fewer client-side indexes to search, and/or allowing each hash function to be even more highly concentrated.

In this embodiment, different client-held encryption keys can be used for document names in the two SSE services on the two search servers. In following this approach, it is important that the two SSEs services are as independent as possible, to reduce the risk of someone successfully compromising both. For example and in one embodiment, the two search servers can be hosted by two different hosting providers that require independent access credentials. In one embodiment, the two server-side indexes can use different hash functions for a given hashed search token, resulting in to two sets of server-side results. Each of the set of results will be different for each server-side index because different hash functions used. In this embodiment, the client can take the intersection of the two result sets to know which client-side indexes to look in. In addition, the intersection of the two result sets will be smaller than or equal to the size of the smaller results set for the individual server-side results set. In one embodiment, the intersection can be much smaller than either of the server-side results sets.

While in one embodiment, two server-side indexes are illustrated, in other embodiments, more than two server-side indexes can be used (e.g., four, eight, etc. server side indexes with different hash functions for each of the server-side indexes). In one embodiment, while using more server-side indexes can increase the cost, increasing the number of server-side indexes increases the security of the search as more concentrated hashes can be used. In addition, the performance on the client may increase as an intersection of the server-side results sets will trend smaller as the number of server-side indexes used increases.

In a further embodiment, to reduce a computational burden on the client and to reduce the need for client-server network communication, the intersection of two different result sets could be carried out at the servers. Thus, in this embodiment, if server1 has result set 1 for hash1 and server2 has result set 2 for $hash_2$, server1 can send result set 1 to server2 and server2 can generate the intersection for result sets 1 and 2, and send the intersecting set to the client.

In another embodiment, before sending result set to server2, server1 could hash each result-id in result set 1 using a one-way but sparse hash known to server2. This one-way hash could be negotiated dynamically between the two servers. Server2 can find the intersecting result set by applying the result-id hash to each member of result set 2 generated by server2 and taking the intersection of the two sets of hashed result-ids; server2 can then find the set of unhashed result-ids corresponding to the intersecting set, since server2 will know the actual (unhashed) result-id of any member of the intersection. Server2 can send the correct intersecting result set to client.

In one embodiment, and in more secure embodiment, a simple concentrated hash could be used to divide result ids into two subsets, call them "odd" and "even" results. Server1 then sends the odd results generate by server1 to server2, and server2 sends the even results to server1. In this embodiment, both servers perform an intersection of the odd-even results sets and sends the intersections to the client. In a model using N+2 servers (N>=0) are used to perform the intersection, these servers can use a concentrated hash to split the corresponding result sets into N+2 subsets, S1, S2, . . . SN+2, and send the subset to the corresponding server to perform an intersection.

To reduce burden on client, and in one embodiment, partial metadata is stored in each server index, such that metadata from the server indexes could allow the metadata to be reassembled. For instance, suppose at index entry creation time metadata (such as text of match, location in file, and/or other types of metadata used in the searching) was compressed and encrypted and the odd bits of data were sent to server-index1, even bits sent to server-index2. These servers could provide that subdivided metadata to the client on request, and the client could reassemble the subdivided metadata. In this embodiment, reassembling the metadata on demand avoids the client having to maintain the metadata in the client side index. In one embodiment, the larger part of the index would be this metadata.

In a further embodiment, the metadata can include object identifiers, name, and content information, which avoids the need for a client to maintain an index. Instead, the client could scan the intersected set of index entries returned by servers, including the metadata, to find actual matches at search time. In this embodiment, the client would need some access or knowledge of the encryption key for the metadata. For example and in one embodiment, there could be a small client-side store for the encryption key, or the encryption key could be derived algorithmically using the data and a secret key/salt maintained by the client.

In one embodiment, if server-side metadata is being used in combination with servers performing result-set intersections, the servers sending each other result sets will not send each other metadata. The servers will send each other result identifier sets, intersections will be performed as described, and result identifier intersecting set or sets will be sent to client. The client will then retrieve result metadata from the servers based on result ids it has received. In a further embodiment, to reduce a computational burden on client and client-network communication, each involved server could retrieve metadata for result identifiers found to be in an intersecting set, and attach that metadata to the result identifier set sent to the client. The metadata can remain opaque to the server in this case, for instance if encrypted using a client side key.

As described in above with reference to FIGS. 10-13, the client uses encryption keys that are "known only to the client". In one embodiment, the client can share encryption keys between clients, for instance via public-key encryption using the SVSS as described above with reference for FIGS. 8 and 9AB above. In one embodiment, sharing keys and placing client-side indexes in storage that is accessible by multiple clients allows for shared "client-side" indexes.

Furthermore and in one embodiment, by sharing keys, there can be "utility clients" that create indexes that accessed by actual users' clients. For example and in one embodiment, suppose there is a very large data set. A "utility client" might create the client-side indexes and pass the necessary SSE-index entries to the central SSE system(s) on one or more search servers. The utility client can share the client-side-index encryption keys with any user who should have access to the data set. As a result, using the methods described herein, those users can execute searches against the large data set without queries, results, or document content leaking via the central SSE system.

Figure 14:
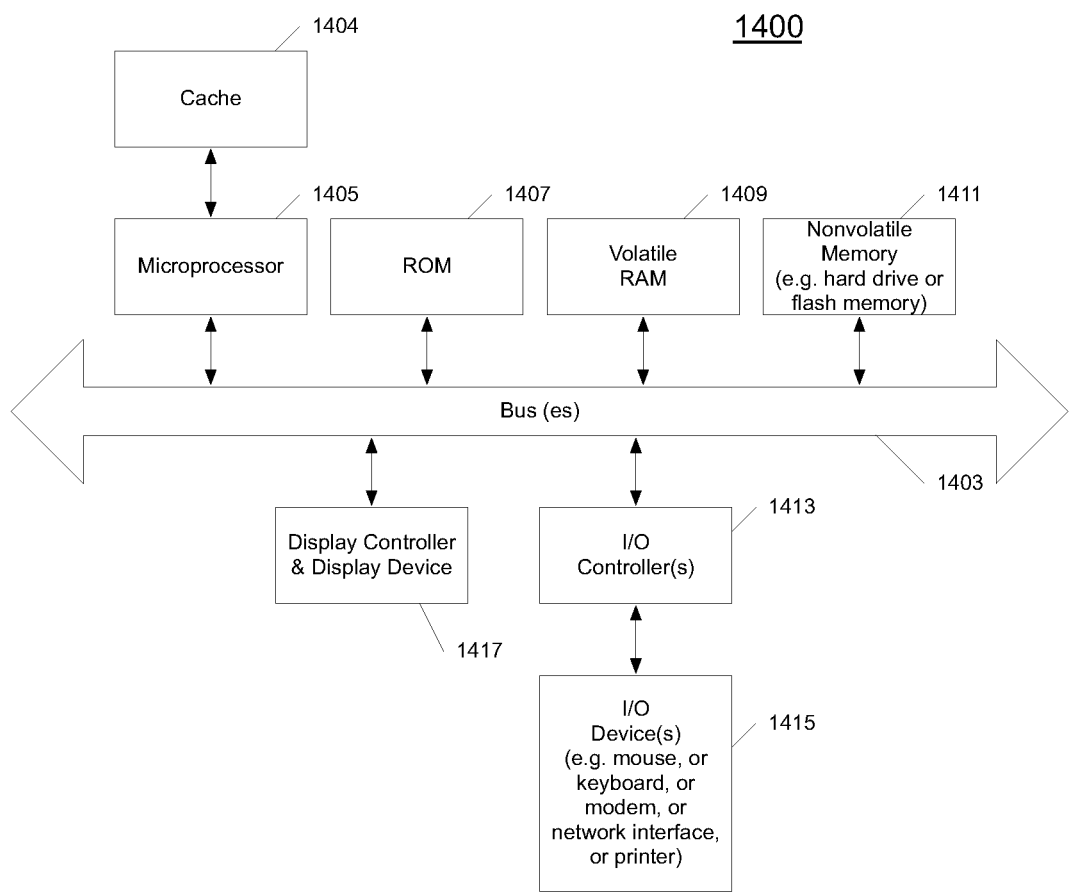
FIG. 14 illustrates one example of a typical computer system, which may be used in conjunction with the embodiments described herein.

FIG. 14 shows one example of a data processing system 1400, which may be used with one embodiment of the present invention. For example, the system 1400 may be implemented including a client 102 as shown in FIG. 1. Note that while FIG. 14 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 14, the computer system 1400, which is a form of a data processing system, includes a bus 1403 which is coupled to a microprocessor(s) 1405 and a ROM (Read Only Memory) 1407 and volatile RAM 1409 and a non-volatile memory 1411. The microprocessor 1405 may include one or more CPU(s), GPU(s), a specialized processor, and/or a combination thereof. The microprocessor 1405 may retrieve the instructions from the memories 1407, 1409, 1411 and execute the instructions to perform operations described above. The bus 1403 interconnects these various components together and also interconnects these components 1405, 1407, 1409, and 1411 to a display controller and display device 1417 and to peripheral devices such as input/output (I/O) devices which may be mice, keyboards, modems, network interfaces, printers and other devices which are well known in the art. Typically, the input/output devices 1415 are coupled to the system through input/output controllers 1413. The volatile RAM (Random Access Memory) 1409 is typically implemented as dynamic RAM (DRAM), which requires power continually in order to refresh or maintain the data in the memory.

The mass storage 1411 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1411 will also be a random access memory although this is not required. While FIG. 14 shows that the mass storage 1411 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1403 may include one or more buses connected to each other through various bridges, controllers and/or adapters as is well known in the art.

Figure 15:
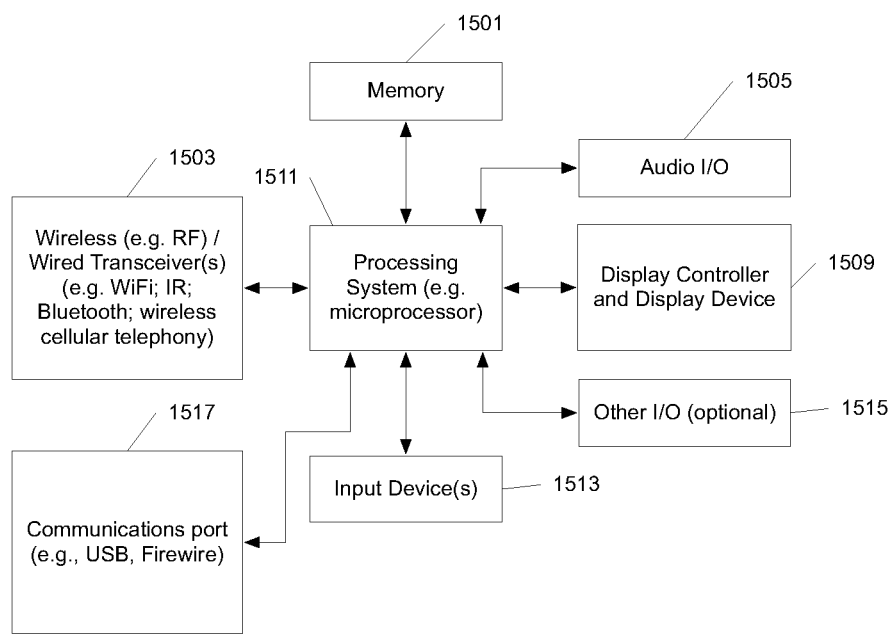
FIG. 15 shows an example of a data processing system, which may be used with one embodiment of the present invention.

FIG. 15 shows an example of another data processing system 1500 which may be used with one embodiment of the present invention. For example, system 1500 may be implemented as a client 102 as shown in FIG. 1. The data processing system 1500 shown in FIG. 15 includes a processing system 1511, which may be one or more microprocessors, or which may be a system on a chip integrated circuit, and the system also includes memory 1501 for storing data and programs for execution by the processing system. The system 1500 also includes an audio input/output subsystem 1505, which may include a microphone and a speaker for, for example, playing back music or providing telephone functionality through the speaker and microphone.

A display controller and display device 1509 provide a visual user interface for the user; this digital interface may include a graphical user interface which is similar to that shown on a Macintosh computer when running OS X operating system software, or Apple iPhone when running the iOS operating system, etc. The system 1500 also includes one or more wireless transceivers 1503 to communicate with another data processing system, such as the system 1500 of FIG. 15. A wireless transceiver may be a WLAN transceiver, an infrared transceiver, a Bluetooth transceiver, and/or a wireless cellular telephony transceiver. It will be appreciated that additional components, not shown, may also be part of the system 1500 in certain embodiments, and in certain embodiments fewer components than shown in FIG. 15 may also be used in a data processing system. The system 1500 further includes one or more communications ports 1517 to communicate with another data processing system, such as the system 1500 of FIG. 15. The communications port may be a USB port, Firewire port, Bluetooth interface, etc.

The data processing system 1500 also includes one or more input devices 1513, which are provided to allow a user to provide input to the system. These input devices may be a keypad or a keyboard or a touch panel or a multi touch panel. The data processing system 1500 also includes an optional input/output device 1515 which may be a connector for a dock. It will be appreciated that one or more buses, not shown, may be used to interconnect the various components as is well known in the art. The data processing system shown in FIG. 15 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1500 may be a network computer or an embedded processing device within another device, or other types of data processing systems, which have fewer components or perhaps more components than that shown in FIG. 15.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "encrypting," "decrypting," "receiving,"

"determining," "computing," "sending," "retrieving," "creating," "randomizing," "de-randomizing," "storing," "XORing" "deleting," "assembling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

The invention claimed is:

1. A non-transitory machine-readable medium having executable instructions to cause one or more processing units to perform a method to index an object in a client-side index, the method comprising:
   receiving an object;
   encrypting an object name of the object using a client private key;
   computing a hash of the encrypted object name using a first hash function;
   selecting one of a plurality of first indexes using the hashed encrypted object name; and
   indexing, with a first device, the object in the selected one of the plurality of the first indexes.

2. The non-transitory machine-readable medium of claim 1, wherein the first hash function maps one hash result to a plurality of the encrypted object names.

3. The non-transitory machine-readable medium of claim 1, wherein a distribution of first hash function values substantially evenly distributed among the plurality of first indexes.

4. The non-transitory machine-readable medium of claim 1, wherein the plurality of first indexes are divided by time.

5. The non-transitory machine-readable medium of claim 4, wherein the time sub-division is based on at least a document update time.

6. The non-transitory machine-readable medium of claim 1, wherein the object contents are indexed in a second index.

7. The non-transitory machine-readable medium of claim 6, wherein the object contents are tokenized and indexed in the second index by a second device.

8. The non-transitory machine-readable medium of claim 1, wherein the indexing of the object further comprises:
   storing the encrypted object name in an index entry of the selected one of the plurality of the first indexes.

9. The non-transitory machine-readable medium of claim 8, wherein metadata for the object is associated with the index entry.

10. The non-transitory machine-readable medium of claim 8, wherein the metadata is stored on the client.

11. A method to index an object in a client-side index, the method comprising:
    receiving an object;
    encrypting an object name of the object using a client private key;
    computing a hash of the encrypted object name using a first hash function;
    selecting one of a plurality of client-side indexes using the hashed encrypted object name; and
    indexing, with a client, the object in the selected one of the plurality of the client-side indexes.

12. The method of claim 11, wherein the first hash function maps one hash result to a plurality of the encrypted object names.

13. The method of claim 11, wherein a distribution of first hash function values substantially evenly distributed among the plurality of client-side indexes.

14. The method of claim 11, wherein the plurality of client-side indexes are divided by time.

15. The method of claim 14, wherein the time sub-division is based on at least a document update time.

16. The method of claim 11, wherein the object contents are indexed in a server.

17. The method of claim 16, wherein the object contents are tokenized and indexed in a server-side index by the server.

18. The method of claim 11, wherein the indexing of the object further comprises:
    storing the encrypted object name in an index entry of the selected one of the plurality of the client-side indexes.

19. The method of claim 18, wherein metadata for the object is associated with the index entry.

20. The method of claim 18, wherein the metadata is stored on the client.

* * * * *